US011995937B2

(12) United States Patent
Ozono et al.

(10) Patent No.: US 11,995,937 B2
(45) Date of Patent: May 28, 2024

(54) GATE OPEN/CLOSE CONTROL DEVICE AND GATE OPEN/CLOSE CONTROL METHOD

(71) Applicant: Panasonic Intellectual Property Management Co., Ltd., Osaka (JP)

(72) Inventors: Masashi Ozono, Kanagawa (JP); Yoshifumi Yonemoto, Kanagawa (JP); Kunio Furuta, Chiba (JP); Takao Shime, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 353 days.

(21) Appl. No.: 17/433,894

(22) PCT Filed: Feb. 5, 2020

(86) PCT No.: PCT/JP2020/004330
§ 371 (c)(1),
(2) Date: Aug. 25, 2021

(87) PCT Pub. No.: WO2020/179335
PCT Pub. Date: Sep. 10, 2020

(65) Prior Publication Data

US 2022/0108576 A1 Apr. 7, 2022

(30) Foreign Application Priority Data

Mar. 4, 2019 (JP) ................................ 2019-038658

(51) Int. Cl.
*G07C 9/00* (2020.01)
*G07C 9/10* (2020.01)
(Continued)

(52) U.S. Cl.
CPC ........... *G07C 9/37* (2020.01); *G07C 9/00309* (2013.01); *G07C 9/00896* (2013.01); *G07C 9/10* (2020.01);
(Continued)

(58) Field of Classification Search
CPC .. G07C 9/37; G07C 9/00309; G07C 9/00896; G07C 9/10; G07C 9/38; G07C 2009/00634
See application file for complete search history.

(56) References Cited

U.S. PATENT DOCUMENTS

| | | | | |
|---|---|---|---|---|
| 2019/0325682 | A1* | 10/2019 | Petkov | ................ G06V 10/143 |
| 2021/0110625 | A1 | 4/2021 | Kawase | |
| 2022/0222993 | A1* | 7/2022 | Kawase | .................... G06T 7/00 |

FOREIGN PATENT DOCUMENTS

| | | | |
|---|---|---|---|
| CN | 105469478 | A | 4/2016 |
| CN | 106504375 | A | 3/2017 |
| JP | 2006-146796 | A | 6/2006 |
| JP | 2006-309490 | A | 11/2006 |

(Continued)

OTHER PUBLICATIONS

International Search Report (ISR) from International Searching Authority (Japan Patent Office) in International Pat. Appl. No. PCT/JP2020/004330, dated Mar. 31, 2020, along with an English language translation thereof.

(Continued)

*Primary Examiner* — Izunna Okeke
(74) *Attorney, Agent, or Firm* — Greenblum & Bernstein, P.L.C.

(57) ABSTRACT

A gate open/close control device (face authentication machine) includes a face image acquirer (camera) that captures a user before passing through a gate device (external device) and acquires a face image for authentication of the user; a transmitter (communicator) that transmits a processing request for face authentication to the face colla- (Continued)

tion server based on the face image for authentication; a receiver (communicator) that receives the authentication result returned from the face collation server; and a controller that reflects the authentication result on an open/close control signal of the gate device.

6 Claims, 25 Drawing Sheets

(51) Int. Cl.
*G07C 9/37* (2020.01)
*G07C 9/38* (2020.01)

(52) U.S. Cl.
CPC ..... *G07C 9/38* (2020.01); *G07C 2009/00634* (2013.01)

(56) References Cited

FOREIGN PATENT DOCUMENTS

| | | |
|---|---|---|
| JP | 2009-138490 | 6/2009 |
| JP | 2011-205308 | 10/2011 |
| JP | 2017-182326 A | 10/2017 |
| JP | 2017-223037 | 12/2017 |
| JP | 2018-012467 A | 1/2018 |
| WO | 2018/181968 | 10/2018 |

OTHER PUBLICATIONS

English Translation of Chinese Search Report dated Aug. 30, 2022 for the related Chinese Patent Application No. 202080017580.9.

English Translation of Chinese Search Report dated Apr. 13, 2023 from the China National Intellectual Property Administration (CNIPA) for the related Chinese Patent Application No. 202080017580.9.

* cited by examiner

GATE OPEN/CLOSE CONTROL DEVICE AND GATE OPEN/CLOSE CONTROL METHOD

TECHNICAL FIELD

The present disclosure relates to a gate open/close control device that controls open/close of a gate device through which a target person passes based on a result of face authentication of the target person and a gate open/close control method.

BACKGROUND ART

In the related art, for example, a gate device is known (refer to PTL 1) that includes a reader which receives an identifier transmitted from a wireless tag (remote type IC card) possessed by the user, an acquirer which acquires a face feature amount registered corresponding to the identifier received from the wireless tag, an imaging portion which images the user, an extractor which extracts the face feature amount from the image data imaged by the imaging portion, a face collator that collates whether the face feature amount extracted by the extractor match the face feature amount acquired by the acquirer, and an open/close controller which opens or closes an exit of a gate according to the result of collation by the face collator.

CITATION LIST

Patent Literature

PTL 1: International Publication No. 2018/181968

SUMMARY OF THE INVENTION

Incidentally, in the above technique in the related art, although it is possible to narrow down the target person of face authentication (that is, registered face feature amount) by the identifier transmitted from the wireless tag of the user, since it is necessary for the user who passes through the gate to carry the IC card at all times, it is difficult to safely manage personal information (that is, information that can identify a specific individual) contained in the IC card. In addition, in the above technique in the related art, no consideration is given to a mechanism in which both face image data and face feature data are placed on a cloud server or the like and the data is safely managed.

In addition, in the above technique in the related art, although the gate device performs processing of collating whether the face feature amount extracted by the extractor match the face feature amount acquired by the acquirer, no consideration is given to a mechanism that simplifies the processing related to the face authentication when a user enters or leaves the facility.

Therefore, a main object of the present disclosure is to provide a gate open/close control device that can easily perform face authentication when a user enters and leaves the facility while safely managing the face image of the user who uses the facility and a gate open/close control method.

The gate open/close control device of the present disclosure that makes a processing request for face authentication of a user in a facility to a face authentication server which performs the face authentication when the user passes through a gate device for entering and leaving in the facility, and controls open/close of the gate device according to an authentication result, the device including a face image acquirer that captures the user before passing through the gate device and acquires a face image for authentication of the user; a transmitter that transmits the processing request for the face authentication to the face authentication server based on the face image for authentication; a receiver that receives the authentication result returned from the face authentication server; and a controller that reflects the authentication result on an open/close control signal of the gate device.

In addition, the gate open/close control method of the present disclosure that makes a processing request for face authentication of a user in a facility to a face authentication server which performs the face authentication when the user passes through a gate device for entering and leaving in the facility, and controls open/close of the gate device according to an authentication result, the method including capturing the user before passing through the gate device and acquiring a face image for authentication of the user; transmitting the processing request for the face authentication to the face authentication server based on the face image for authentication; receiving the authentication result returned from the face authentication server; and reflecting the authentication result on an open/close control signal of the gate device.

According to the present disclosure, it is possible to easily perform the face authentication when the user enters and leaves the facility while safely managing the face image of the user who uses the facility.

DESCRIPTION OF EMBODIMENT

Figure 1:
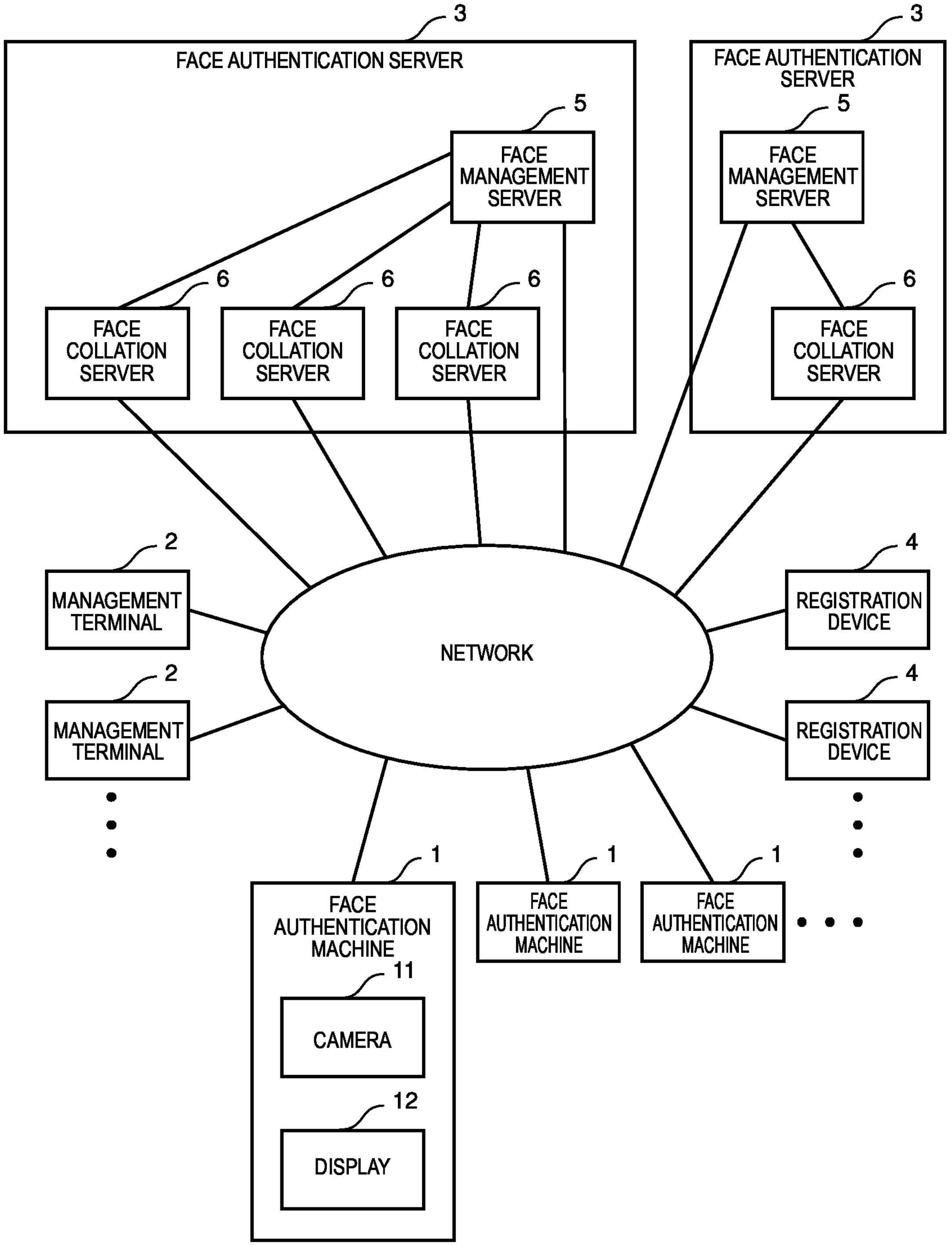
FIG. 1 is an overall configuration diagram of a face authentication system according to an exemplary embodiment of the present disclosure.

A first disclosure made to solve the problem is a gate open/close control device that makes a processing request for face authentication of a user in a facility to a face authentication server which performs the face authentication when the user passes through a gate device for entering and leaving in the facility, and controls open/close of the gate device according to an authentication result, the device including a face image acquirer that captures the user before passing through the gate device and acquires a face image for authentication of the user; a transmitter that transmits the processing request for the face authentication to the face authentication server based on the face image for authentication; a receiver that receives the authentication result returned from the face authentication server; and a controller that reflects the authentication result on an open/close control signal of the gate device.

Accordingly, the face authentication of the user is performed by the face authentication server, and the authentication result is reflected on the open/close control signal of the gate device, so that it is possible to easily perform the face authentication when the user enters and leaves the facility while safely managing the face image of the user who uses the facility.

In addition, in a second disclosure, the device further includes a power feeder that receives power supply from the gate device.

Accordingly, it is possible to receive power supply with a simple configuration. In addition, when the gate device is connected to an uninterruptible power supply device (or emergency power supply), the gate device can operate normally even in a case where a power failure occurs in the facility, and the security of the facility can be maintained.

In addition, in a third disclosure, the device further includes a storage unit that stores the face image for authentication, in which the face image for authentication stored in the storage unit is deleted after the face authentication processing is completed.

Accordingly, even in a case where the gate open/close control device is attached to the gate device used by an unspecified person, it is possible to prevent the face image from being stored in the gate open/close control device for a long period of time, and to manage the face image of the user more safely.

In addition, a fourth disclosure is a gate open/close control method that makes a processing request for face authentication of a user in a facility to a face authentication server which performs the face authentication when the user passes through a gate device for entering and leaving in the facility, and controls open/close of the gate device according to an authentication result, the method including capturing the user before passing through the gate device and acquiring a face image for authentication of the user; transmitting the processing request for the face authentication to the face authentication server based on the face image for authentication; receiving the authentication result returned from the face authentication server; and reflecting the authentication result on an open/close control signal of the gate device.

Accordingly, the face authentication of the user is performed by the face authentication server, and the authentication result is reflected on the open/close control signal of the gate device, so that it is possible to easily perform the face authentication when the user enters and leaves the facility while safely managing the face image of the user who uses the facility.

Hereinafter, an exemplary embodiment of the present disclosure will be described with reference to the drawings.

FIG. 1 is an overall configuration diagram of a face authentication system according to the present exemplary embodiment.

This face authentication system is provided with face authentication machine 1, management terminal 2, face authentication server 3 (cloud server), and registration device 4 (face authentication registration device). Face authentication server 3 is provided with face management server 5 (face authentication management server) and face collation server 6.

Face authentication machine 1, management terminal 2, registration device 4, face management server 5, and face collation server 6 are connected to each other via a network such as the Internet. The face authentication system is constructed for each provider (business operator) of the face authentication service. A plurality of face authentication machines 1 are installed at each place where the face authentication is required, such as a building entrance and exit or a room entrance and exit. Registration device 4 is disposed at a reception counter or the like that accepts a visitor to the facility. A required number of face collation servers 6 are provided according to the number of face authentication machines 1 and the like.

Face authentication machine 1 is provided with camera 11, and camera 11 acquires a captured image of a user (a visitor of a facility, a worker at a company, a store, or the like in the facility). In addition, face authentication machine 1 includes display 12, and display 12 displays the face authentication result acquired from face collation server 6 and notifies the user of the face authentication result.

Management terminal 2 is operated by an administrator of the face authentication system, is configured to include a personal computer (PC), and a management application that manages the operations of face authentication machine 1, registration device 4, face management server 5, and face collation server 6 is installed. The management application enables the administrator to perform various management tasks. The management application is implemented as a Web application. As for the administrator, a plurality of administrator groups having different access authority for each information in the face authentication system are set.

Registration device 4 acquires information used for processing the face authentication of the user (hereinafter, referred to as authentication information). The authentication information may include not only a face image for registration of each user but also specific information that is information other than the face image, the specific information being used for specifying the user.

As the specific information, information displayed on the business card of the user, information displayed on the payment card (for example, credit card or cash card) possessed by the user, information indicating the place of stay of the user in the facility, and the like can be used. The specific information may include information that can permanently specify the user, such as the name of the user. However, the specific information may be information that can temporarily specify the user, such as a user number given to the user of the facility, the number of the conference room (including any space where an interview is possible) used by the user in the facility, and the number of the room in which the user stays at the accommodation facility, for example.

Face management server 5 unitarily manages user information (including personal information). Specifically, face management server 5 accumulates face image data for registration and specific information for each user in association with each other, and manages the face image data and specific information. Face management server 5 acquires a face image for registration and specific information from registration device 4 at the time of user registration. In addition, face management server 5 may acquire at least a part of the information included in the face image for registration and the specific information from management terminal 2 (that is, administrator).

At the time of face authentication, face collation server 6 acquires the face image data for authentication of the target person of the face authentication from face authentication machine 1, generates face feature data of the target person from the face image data, performs face collation by comparing the face feature data of the target person with the face feature data of the registrant (registered user) stored in a master device, and performs the face authentication for determining whether or not the target person is the registrant.

In addition, face collation server 6 acquires the face image data for user registration from face management server 5 (or registration device 4) at the time of user registration prior to the face authentication, and generates the face feature data of the user from the face image data to store the face feature data on the master device. In some cases, face collation server 6 can also acquire a captured image of the user from management terminal 2 (that is, administrator) and acquire the face image data from the captured image.

In the present exemplary embodiment, although face management server 5 (face image manager) and face collation server 6 (face image collator) are assumed to exist in physically different information processing devices, face management server 5 and face collation server 6 may exist in a single information processing device.

In addition, in the present exemplary embodiment, although management terminal 2 and face management server 5 are provided, management terminal 2 and face management server 5 can be configured as a single information processing device. For example, by installing the management application on face management server 5, face management server 5 can also serve as management terminal 2. In addition, an administrator with limited access authority to the information of the face authentication system (for example, worker at a company or store in the facility) can access face management server 5 from the own information processing terminal (PC, tablet, and the like) and refer to information that is less necessary to be kept secret (for example, information on the conference that the user attended described later, information on the personal connections of the user, and the like) than the personal information of the user.

In addition, in the present exemplary embodiment, although the face feature amount collation is performed, the face collation is not limited to the face feature amount collation, and a collation method to which machine learning or the like is applied may be adopted. Furthermore, the present exemplary embodiment can be applied to biometric authentication other than the face authentication.

Figure 2:
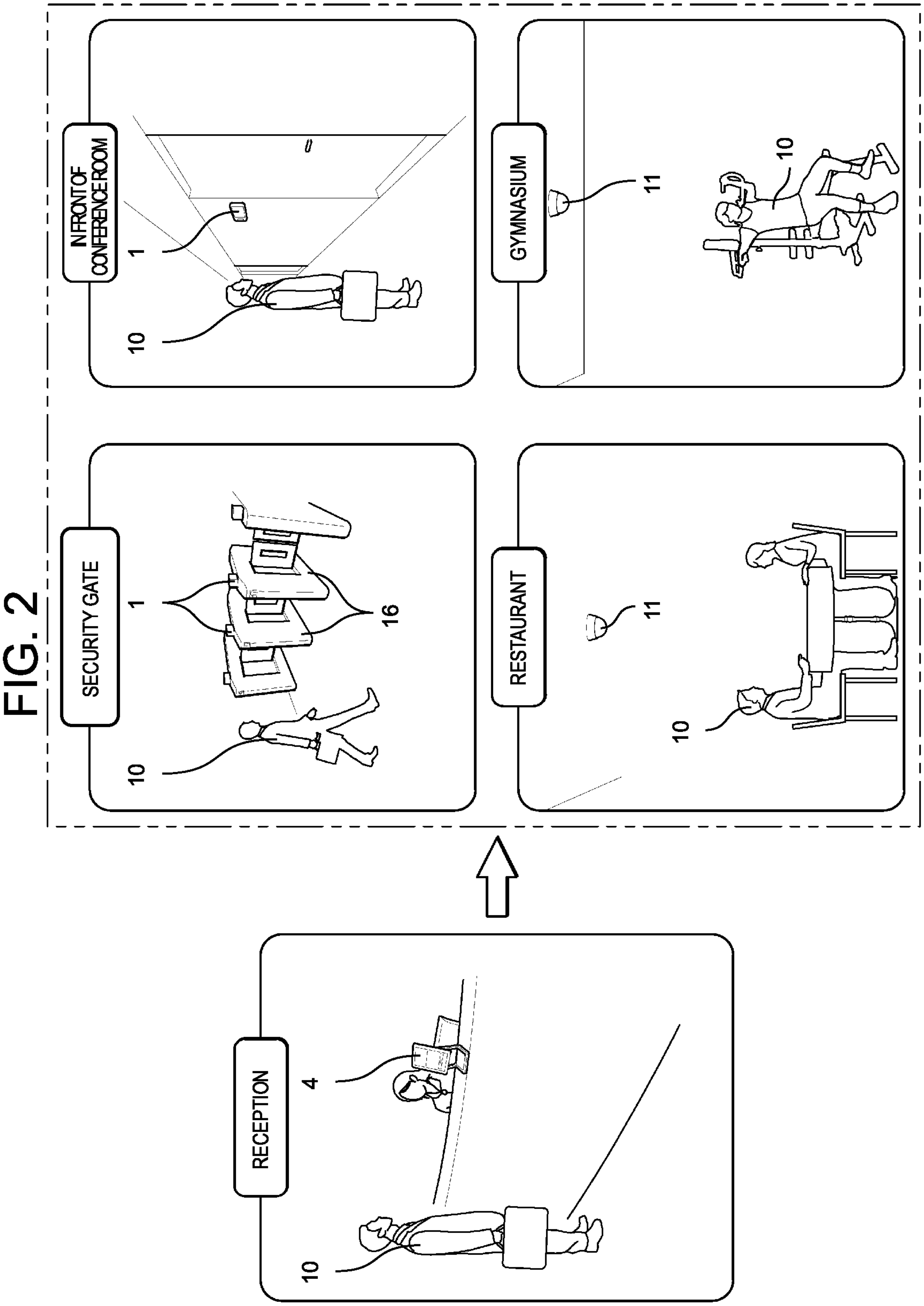
FIG. 2 is an explanatory diagram illustrating an example of an event occurring in a facility.

Next, an example of an event generated by the action of the user in the facility to which the face authentication system is applied will be described. FIG. 2 is an explanatory diagram illustrating an example of an event generated in a facility.

As illustrated in FIG. 2, user 10 in the facility can perform an operation of registration as a user in the facility (that is, registration of information used for face collation processing) by registration device 4 disposed at the reception. For registered users who revisit the facility within a predetermined period, registration by registration device 4 can be omitted.

At the facility, the face authentication is performed for each of the various events (refer to inside the two-dot chain line in FIG. 2) generated due to the action of people (including the registered user) within the facility.

For example, registered user 10 can pass through the security gate by receiving the face authentication in front of the security gate that manages the passage of user 10 in the facility. Face authentication machine 1 that cooperates with gate device 16 (that is, controls an open and closed state of a door) can be installed in the security gate.

In addition, for example, registered user 10 can enter the conference room by receiving the face authentication in front of the conference room in the facility. In front of the conference room, face authentication machine 1 that cooperates with a lock device that locks the door of the conference room (that is, controls the locking or unlocking of the door) can be disposed. For example, in an accommodation facility such as a hotel, instead of the conference room, face authentication machine 1 that cooperates with a lock device for the door of the room in which the user stays can be installed.

In addition, for example, registered user 10 can automatically settle a usage fee of a restaurant by receiving the face authentication at the restaurant in the facility. Camera 11 capable of capturing the face of user 10 is installed in the restaurant, and face authentication machine 1 cooperates with a payment terminal device (or payment system) used for payment of the usage fee at the restaurant.

In addition, for example, registered user 10 can automatically settle a usage fee of a gymnasium by receiving the face authentication at the gymnasium in the facility. Camera 11 capable of capturing the face of the user is installed in the gymnasium, and face authentication machine 1 cooperates with the payment terminal device (or payment system) used for payment of the usage fee at the gymnasium.

The events generated in the facility are not limited to the above examples, and may include various events such as the settlement of a usage fee in a parking lot in the facility, the settlement of a usage fee of a laundry service in the facility, and the settlement of a usage fee of a bathhouse in the facility, for example.

In addition, for example, in a case where an employee of a company that provides services in the facility is registered as a user, by arranging face authentication machine 1 at the entrance and exit of the backyard of the facility (for example, warehouse, workshop, and the like), it is possible to ensure the security in the backyard.

Figure 3:
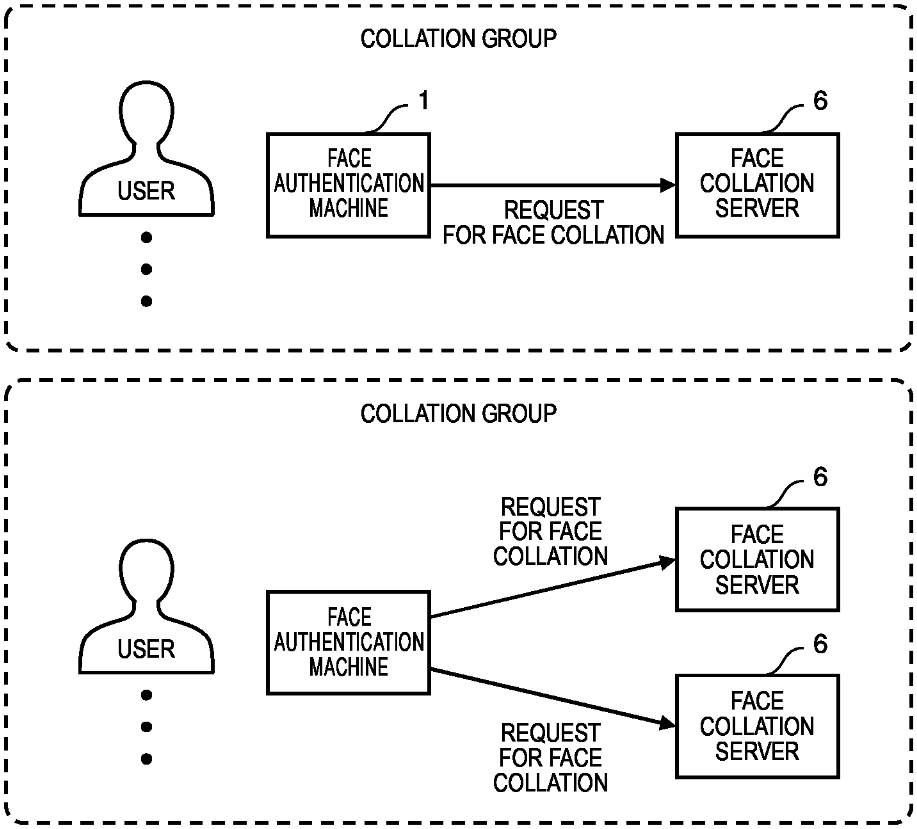
FIG. 3 is an explanatory diagram illustrating an outline of a collation group.

Next, a collation group will be described. FIG. 3 is an explanatory diagram illustrating an outline of the collation group.

In the present exemplary embodiment, the users are divided into groups and a collation group is set for each user according to the installation location of face authentication machine 1 for which the user receives the face authentication. In addition, similarly to the user, face authentication machines 1 are divided into groups according to the installation location of face authentication machine 1, and a collation group is set for each face authentication machine 1. Furthermore, face collation servers 6 corresponding to face authentication machine 1, that is, face collation servers 6 that receive an inquiry for face collation (request) from face authentication machine 1, are divided into groups similarly to face authentication machine 1, and a collation group is set for each face collation server 6.

For example, in face authentication machine 1 installed at the entrance of a multi-tenant building in which a plurality of companies are occupying, users belonging to the plurality of companies receive the face authentication. On the other hand, information of users who belong to different organizations cannot be managed in the same database. Therefore, in such a case, a collation group for each of the plurality of companies is formed, user registration information is stored for each collation group, and face authentication machine 1 performs an inquiry for face collation to face collation server 6 of the collation group for each company.

The user can be authenticated only by face authentication machine 1 corresponding to the collation group to which the user belongs. Therefore, even a registered user cannot be authenticated by face authentication machine 1 that does not belong to his or her collation group, for example, face authentication machine 1 of a building that he or she is not allowed to enter. For example, in a case where a user working at a certain business office goes to another business office, the user cannot be authenticated by face authentication machine 1 of that business office.

Figure 4A:
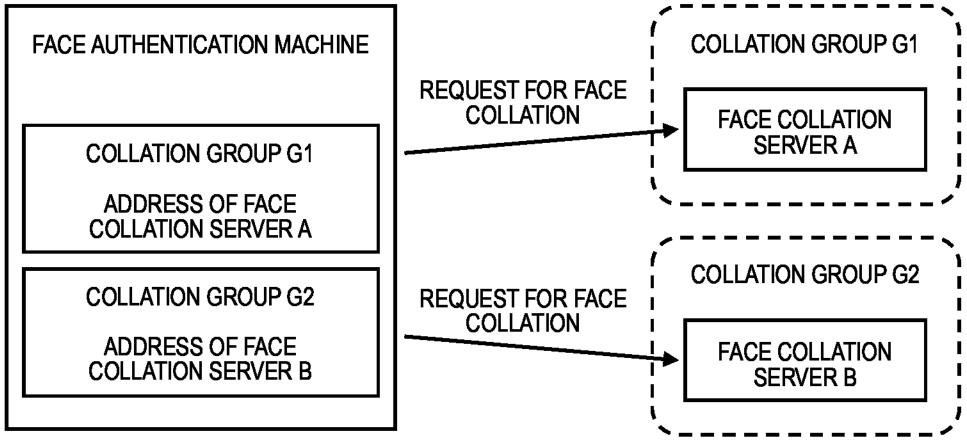
FIG. 4A is an explanatory diagram illustrating an outline of an inquiry for face collation performed by face authentication machine 1.
Figure 4B:
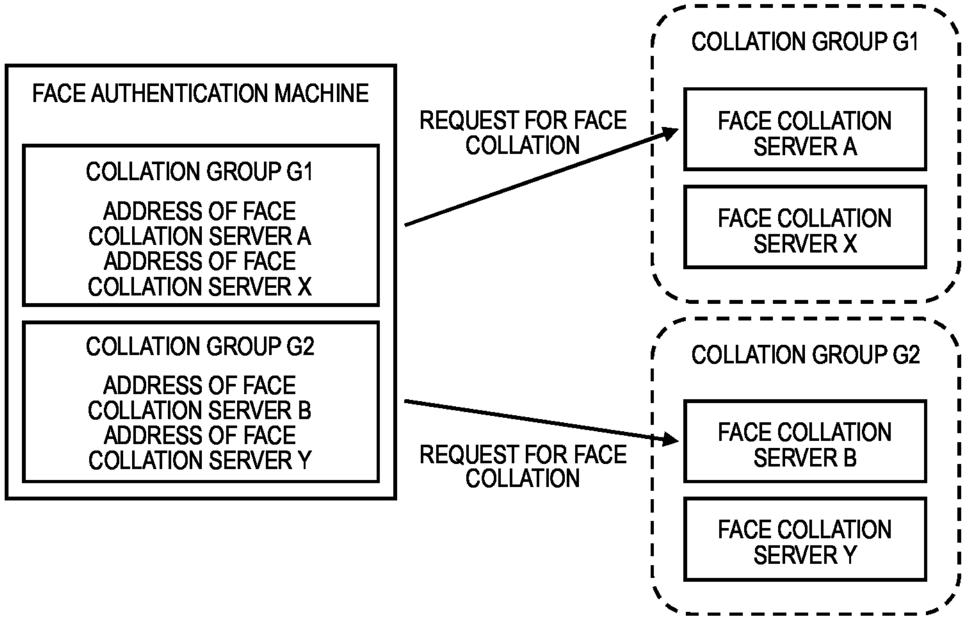
FIG. 4B is an explanatory diagram illustrating an outline of the inquiry for face collation performed by face authentication machine 1.
Figure 4C:
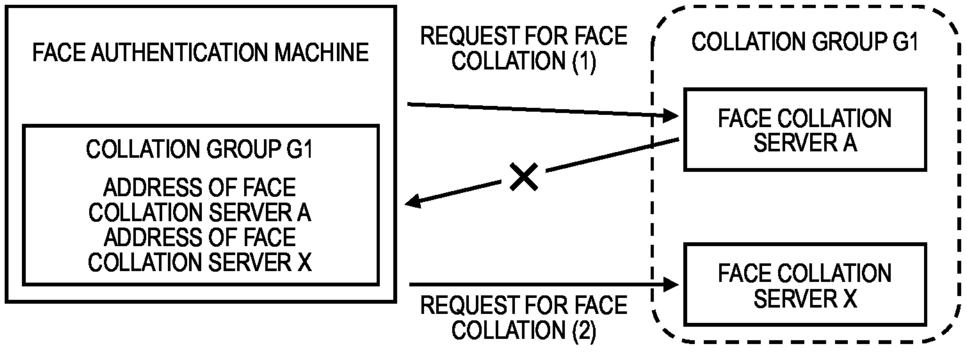
FIG. 4C is an explanatory diagram illustrating an outline of the inquiry for face collation performed by face authentication machine 1.

Next, an inquiry for face collation from face authentication machine 1 to face collation server 6 will be described. FIGS. 4A, 4B, and 4C are explanatory diagrams illustrating an outline of the inquiry for face collation performed by face authentication machine 1.

Face authentication machine 1 performs the inquiry for face collation to face collation server 6 belonging to the same collation group as the master device, and sends a request for face collation (processing request for face authentication) to face collation server 6 which is an inquiry destination (request destination). In addition, face authentication machine 1 holds a network address (IP address) of face collation server 6 as the collation group information, and performs the inquiry for face collation to face collation server 6 corresponding to the master device based on the network address.

An inquiry method for face authentication includes a simultaneous inquiry illustrated in FIG. 4A, a random inquiry illustrated in FIG. 4B, and a sequential inquiry (inquiry destination switching) illustrated in FIG. 4C.

As illustrated in FIG. 4A, in the case of simultaneous inquiry, face authentication machine 1 simultaneously performs the inquiry for face collation to face collation server 6 corresponding to each of the plurality of collation groups. For example, in a case where face authentication machine 1 is installed at the entrance of a multi-tenant building and users of the plurality of collation groups receive the face authentication, face authentication machine 1 simultaneously sends a request for face collation to face collation server 6 of each group.

In order to reduce the load on one face collation server 6, it is also possible to divide and store the face feature data of the user belonging to one collation group in a plurality of face collation servers 6. Also in this case, face authentication machine 1 simultaneously performs the inquiry for face collation to all face collation servers 6 having different registered contents in the same collation group as itself.

As illustrated in FIG. 4B, in the case of a random inquiry, face authentication machine 1 randomly selects face collation server 6 as an inquiry destination for face collation from the plurality of face collation servers 6 in the same collation group as itself. The registered contents of the plurality of face collation servers 6 are the same as each other. That is, the same user is targeted for collation, and the face feature data of the same user is stored. In such an inquiry method, since the inquiry from face authentication machine 1 is distributed to each face collation server 6, the load on each face collation server 6 can be reduced and the load can be distributed.

As illustrated in FIG. 4C, in the case of sequential inquiry, face authentication machine 1 sequentially selects the inquiry destination for face collation from the plurality of face collation servers 6 in the same collation group as itself. Specifically, in a case where an order (priority) is given to face collation server 6, face authentication machine 1 selects face collation server 6 according to the order, and there is no response from the high-ranking face collation server 6, a destination is switched to face collation server 6. That is, face authentication machine 1 selects first-ranked face collation server 6 in the collation group and requests face collation server 6 for face authentication. In a case where there is no response from face collation server 6, face authentication machine 1 selects another face collation server 6 having the next rank in the same collation group, and requests face collation server 6 for the face authentication. Redundancy (backup) can be achieved by such control.

Figure 5A:
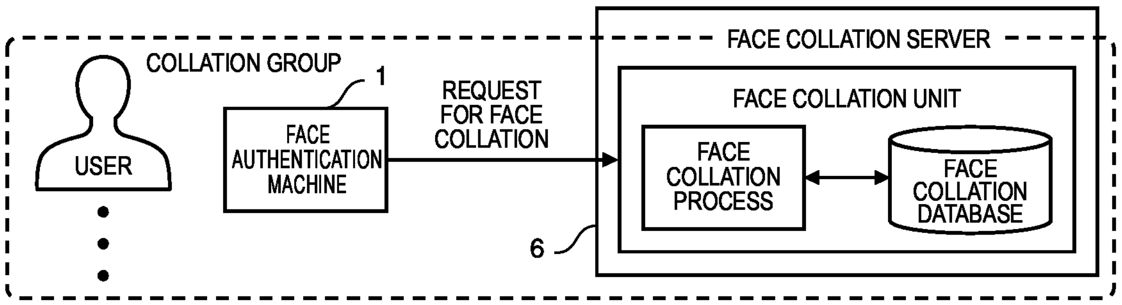
FIG. 5A is an explanatory diagram illustrating an outline of a face collation unit.
Figure 5B:
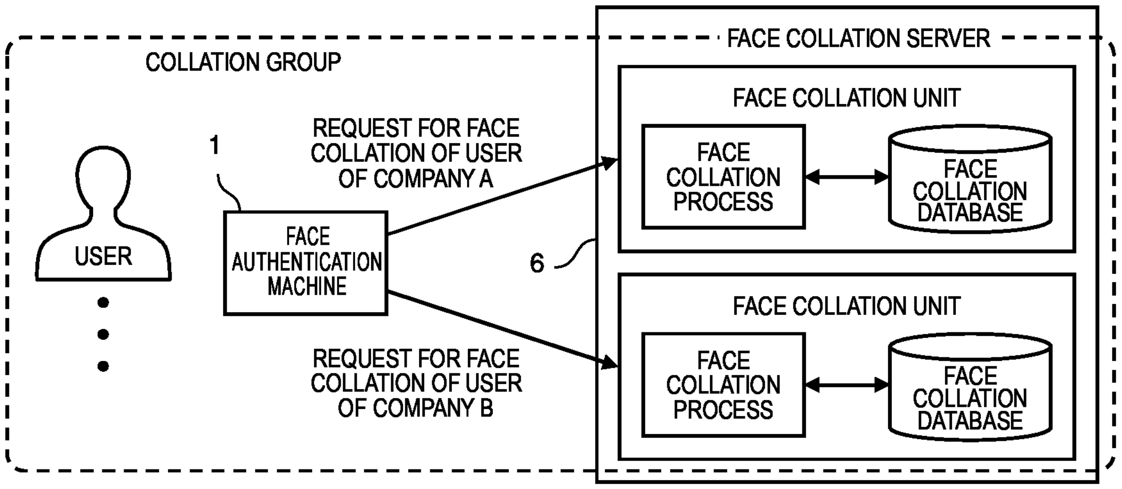
FIG. 5B is an explanatory diagram illustrating an outline of the face collation unit.
Figure 5C:
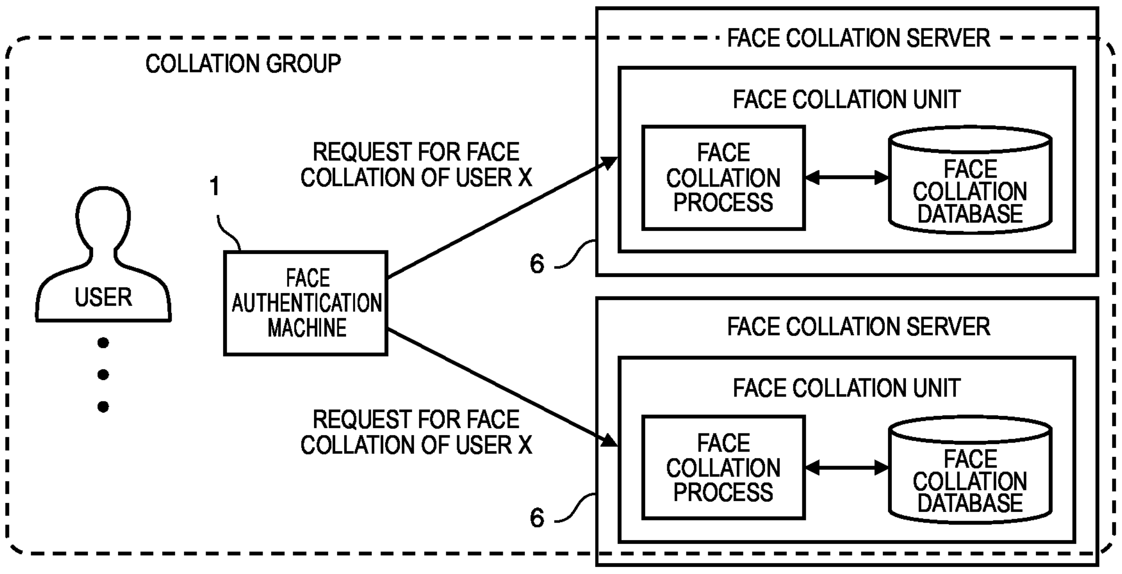
FIG. 5C is an explanatory diagram illustrating an outline of the face collation unit.

Next, a face collation unit will be described. FIGS. 5A, 5B, and 5C are explanatory diagrams illustrating an outline of the face collation unit.

Face collation server 6 may be provided with a plurality of face collation units for performing the face collation. The face collation unit has a face collation process that performs a face collation program, and a face collation database in which information (face feature data) of users to be compared for the face collation is registered.

The face collation unit is provided for each collation group, and performs the face collation in response to a request for face collation from face authentication machine 1 belonging to the collation group. Therefore, one face collation server 6 can handle a plurality of collation groups.

Here, face authentication machine 1 holds the network address (IP address) of face collation server 6 as the collation group information, and can perform the inquiry for face collation to face collation server 6 corresponding to the master device based on the network address. Furthermore, in the present exemplary embodiment, face authentication machine 1 holds the network address (IP address) for each face collation unit, and can perform the inquiry for face collation to the face collation unit corresponding to the master device based on the network address.

In addition, since the face collation database is provided for each collation group, the face feature data of the user can be stored for each collation group. The face collation process performs collation processing between the face feature data stored for each group and the face feature data generated from the face image data acquired from face authentication machine 1 of the same group.

Here, there are various aspects of the correspondence between face authentication machine 1 and the face collation unit. In an example illustrated in FIG. 5A, face collation server 6 is provided with one face collation unit of the collation group to which face authentication machine 1 belongs, and face authentication machine 1 and face collation server 6 correspond to each other by one-to-one correspondence.

In an example illustrated in FIG. 5B, although face authentication machine 1 and face collation server 6 correspond to each other by one-to-one correspondence, face collation server 6 is provided with two face collation units of the collation group to which face authentication machine 1 belongs. In this case, in the case of face authentication machine 1 installed at the entrance of a multi-tenant building, information of users (for example, user A and user B) who belong to different organizations can be managed in different collation databases.

In an example illustrated in FIG. 5C, face authentication machine 1 and face collation server 6 correspond to each other by one-to-two correspondence, and face authentication machine 1 performs the inquiry for face collation (collation request for user) to two face collation servers 6. In this case, by providing two or more same face collation units, that is, face collation units that perform the face collation using the face feature data of the same user, on different face collation servers 6, it is possible to distribute the load of face collation server 6 and deal with life and death.

Figure 6:
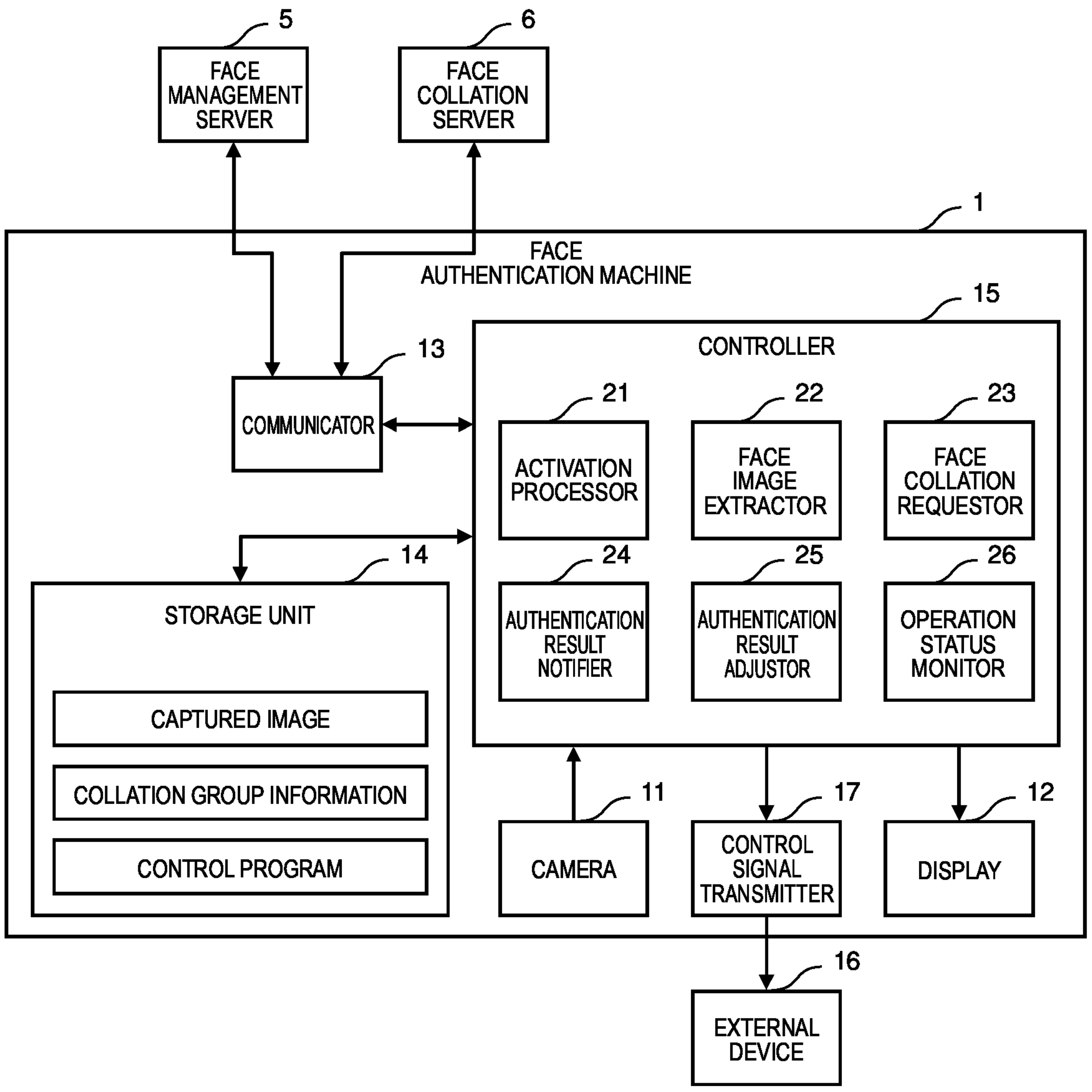
FIG. 6 is a block diagram illustrating a schematic configuration of face authentication machine 1.

Next, a schematic configuration of face authentication machine 1 will be described. FIG. 6 is a block diagram illustrating a schematic configuration of face authentication machine 1.

Face authentication machine 1 is provided with camera 11 (face image acquirer), display 12 (display unit), communicator 13 (transmitter and receiver), storage unit 14, controller 15, and control signal transmitter. 17.

Camera 11 normally captures a predetermined capturing area, when a person enters the capturing area, the person is captured, and a captured image of a target person for the face authentication (including registered user) can be acquired. In order to save power, a motion sensor (not illustrated) may be provided to detect the arrival of a person and activate camera 11.

Display 12 displays the progress of face authentication and the face authentication result, and the person who receives the face authentication can confirm the progress and the face authentication result. A speaker may be provided as an output unit for outputting the authentication result of the target person, and the face authentication result may be notified by voice. In addition, display 12 can be omitted depending on the installation location of face authentication machine 1 (for example, in a case where face authentication machine 1 is installed at the security gate).

Communicator 13 communicates with face collation server 6 via the network. In the present exemplary embodiment, the face image data is transmitted to face collation server 6. In addition, the authentication result of the user is received from face collation server 6. In addition, communicator 13 communicates with face management server 5 via the network. In the present exemplary embodiment, the collation group information and the like are received from face management server 5.

Storage unit 14 stores data of a captured image (face image) of the user, collation group information, a control program performed by a processor constituting controller 15, and the like.

Controller 15 is provided with activation processor 21, face image extractor 22, face collation requestor 23, authentication result notifier 24, authentication result adjustor 25 (history information generator), and operation status monitor 26. Controller 15 includes a processor, and each part of controller 15 is realized by performing the program stored in storage unit 14 by the processor.

When face authentication machine 1 is activated, activation processor 21 acquires the collation group information from face management server 5 and stores the collation group information in storage unit 14. The acquisition of the collation group information is not limited to this, and face management server 5 may distribute the collation group information to target face authentication machine 1 as the collation group information is updated.

Face image extractor 22 can acquire a captured image of a target person for the face authentication from camera 11 (camera image capture), detect a person's face from the captured image (face detection), determine whether the detected face size is appropriate (face size check), cut out a face region from the captured image (face cutout), and acquire data on the face image (face image for authentication) of the target person. Although the face image data may be data of only the image of the face region, the face image data may be a combination of the data of the captured image (image of a predetermined capturing area) and the position information (face frame information) of the face region on the data of the captured image.

Face collation requestor 23 transmits a request for face collation by communicator 13 to face collation server 6 whose master device and the collation group match.

Authentication result notifier 24 notifies the user of the face authentication result by displaying the face authentication result acquired from face collation server 6 by communicator 13 on display 12.

Authentication result adjustor 25 controls to cooperate with external device 16 based on the face collation result of the user acquired from face collation server 6. As external device 16, for example, a gate device (refer to FIG. 2) that manages the passage of the user in the facility, a lock device for the door that manages an entry and exit of the conference room and the predetermined area in the facility, and a payment terminal device for performing payments for services and purchased items received by users in the facility can be used. In addition, in a case where authentication result adjustor 25 cooperates with the lock device for the door of the conference room, authentication result adjustor 25 can generate information on the entry history in which a plurality of the users who enter the conference room are associated with each other.

Face authentication machine 1 and external device 16 are directly connected by a communication cable or the like, or are communicably connected via a known network. Authentication result adjustor 25 can notify the server or the like of the external system including external device 16 of the face collation result of the user by being configured to include the connection application.

Operation status monitor 26 monitors the operation status of the master device and notifies face management server 5 of the operation status of the master device.

Control signal transmitter 17 transmits a control signal for controlling the operation to external device 16.

Figure 7:
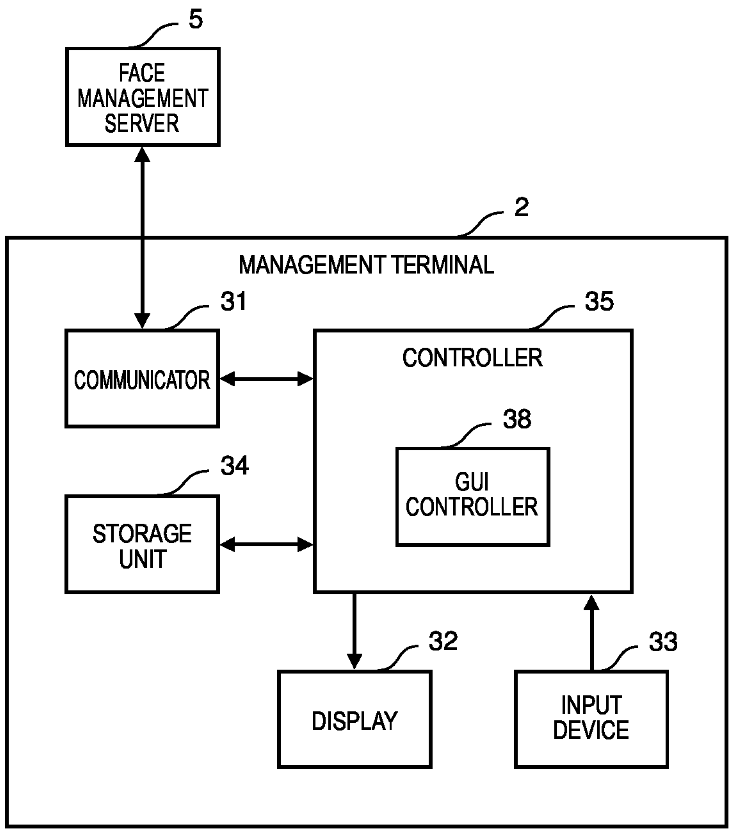
FIG. 7 is a block diagram illustrating a schematic configuration of management terminal 2.

Next, management terminal 2 will be described. FIG. 7 is a block diagram illustrating a schematic configuration of management terminal 2.

Management terminal 2 is provided with communicator 31, display 32 (display unit), input device 33 (operator), storage unit 34, and controller 35.

Communicator 31 communicates with face management server 5 via the network. In the present exemplary embodiment, screen information and the like are received from face management server 5, and administrator operation information and the like corresponding to the screen information and the like are transmitted to face management server 5.

Display 32 displays various screens. Input device 33 is a mouse, a keyboard, or the like, and operates the screen displayed on display 32.

Storage unit 34 stores a program (management application) or the like performed by the processor constituting controller 35.

Controller 35 is provided with graphical user interface (GUI) controller 38. Controller 35 includes a processor, and each part of controller 35 is realized by performing a program (management application) stored in storage unit 34 on the processor.

GUI controller 38 displays various operation screens distributed from face management server 5 on display 32. In addition, the input information is acquired and the screen is controlled according to the input operation of the administrator using input device 33. In present exemplary embodiment, GUI controller 38 controls the display and input of a screen related to login, specifically, a login screen. In addition, GUI controller 38 controls the display and input on screens related to user management, specifically, screens related to registration (individual registration and batch registration), reference, update, and deletion of user information. In addition, GUI controller 38 controls the display and input on screens related to collation group management, specifically, screens related to registration (individual registration and batch registration), reference, update, and deletion of the collation group. In addition, GUI controller 38 controls the display and input on screens related to authentication machine management, specifically, screens related to registration, reference, update, and deletion of the association between the authentication machine and the collation group. In addition, GUI controller 38 controls the display and input of the reference screen of the authentication log (history information on face authentication).

Figure 8:
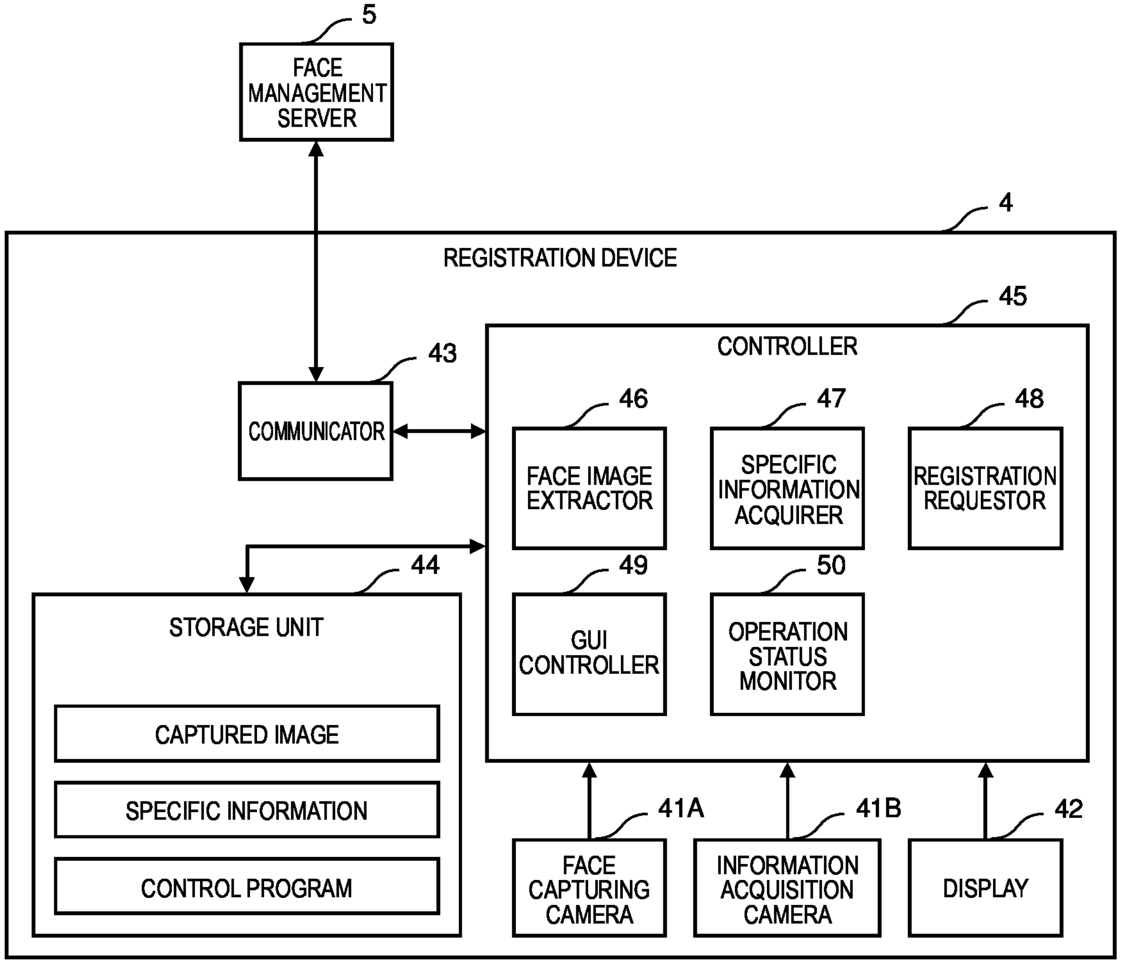
FIG. 8 is a block diagram illustrating a schematic configuration of registration device 4.

Next, a schematic configuration of registration device 4 will be described. FIG. 8 is a block diagram illustrating the schematic configuration of registration device 4.

Registration device 4 is provided with face capturing camera 41A, information acquisition camera 41B (personal information acquirer), display 42 (display unit), communicator 43, storage unit 44, and controller 45.

Face capturing camera 41A can acquire a captured image of the user by capturing the face of the user stopped by at the reception in the facility, for example.

Information acquisition camera 41B can acquire a captured image of a business card by capturing the business card presented by the user. However, information acquisition camera 41B can capture not only a business card but also belongings of the user (for example, a card for payment by the user, a card with information on the accommodation of the user, and the like) on which information capable of specifying the user is displayed and acquire the captured image. Registration device 4 can be provided with a placing table (placing surface) 116 (refer to (C) in FIG. 14) on which a user can easily place a business card or the like in the capturing area of camera 41B in order to reliably capture images by information acquisition camera 41B.

In registration device 4, one camera may be used to configure cameras 41A and 41B for face capturing and information acquisition. In addition, the capturing timing of face capturing camera 41A and information acquisition camera 41B can be determined by the operation of the user (for example, pressing the capturing button) in registration device 4. Alternatively, a receptionist in the facility may decide the capturing timing.

Furthermore, registration device 4 can be provided with an information reading device (for example, RFID reader) capable of reading the specific information of the user by wireless communication from an information recording medium (for example, RFID tag) possessed by the user.

Figure 14:
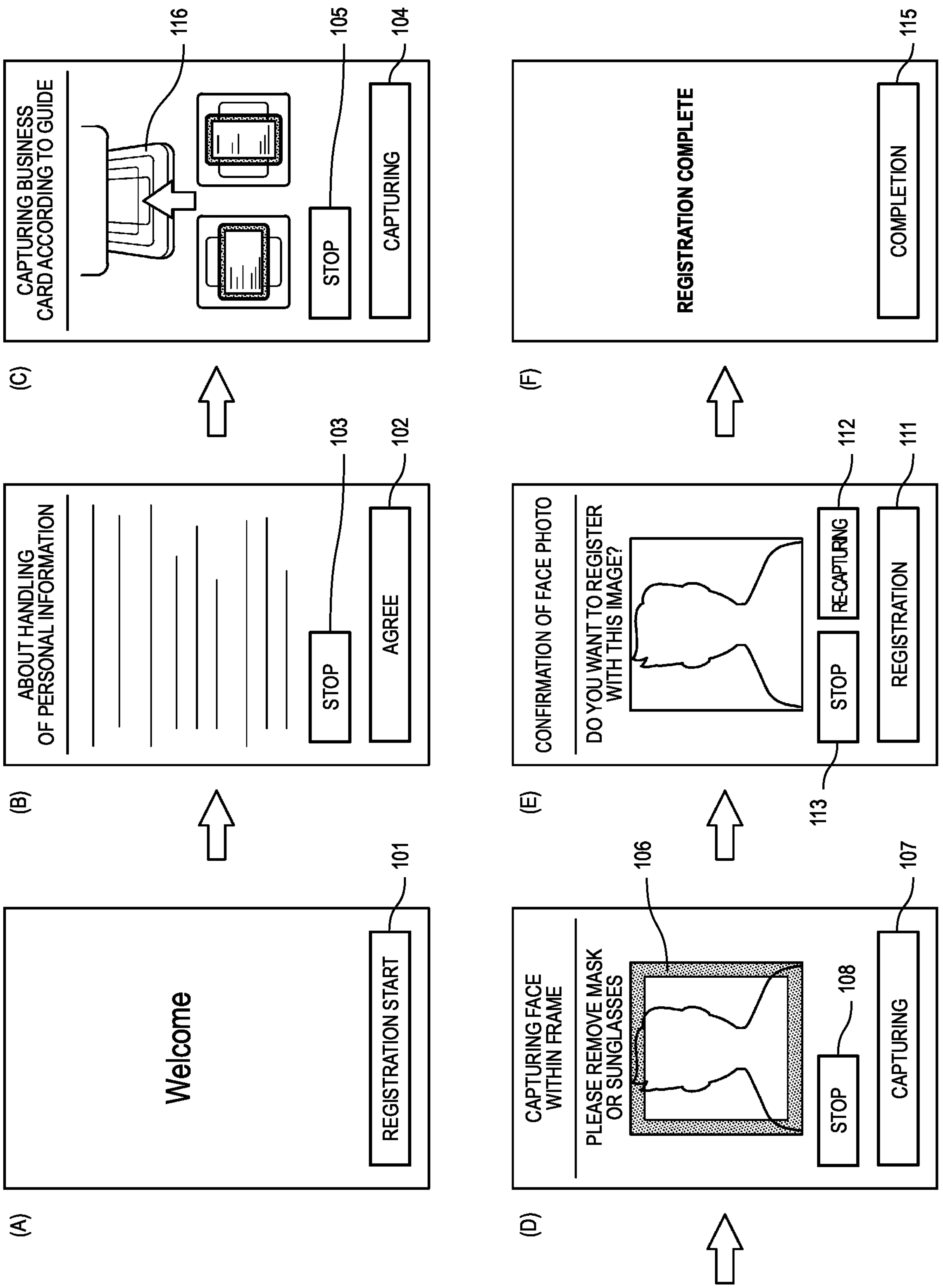
FIG. 14 is an explanatory diagram illustrating an example of a registration screen displayed on registration device 4.

Display 42 can display the registration procedure (refer to (A) to (F) in FIG. 14) of the authentication information (including the personal information of the user) to the user. In addition, by attaching a speaker to display 42, the registration procedure and the like may be guided to the user by voice. In addition, by configuring display 42 with a touch panel, it is possible to acquire the information input by the user by touch operation.

Communicator 43 communicates with face management server 5 via the network. In the present exemplary embodiment, the face image data and the specific information are transmitted to face management server 5.

Storage unit 44 stores data of the captured image (face image) of the user, the specific information of the user, the control program performed by a processor constituting controller 45, and the like.

Controller 45 is provided with face image extractor 46, specific information acquirer 47, registration requestor 48, GUI controller 49, and operation status monitor 50. Controller 45 includes a processor, and each part of controller 45 is realized by performing a program stored in storage unit 44 by the processor.

Face image extractor 46 can acquire a captured image of a target person for face authentication from face capturing camera 41A, detect a person's face from the captured image, and determine whether or not a face image of the user is appropriately acquired. In addition, in a case where the acquired face image is not appropriate, face image extractor 46 can display a message prompting the user to re-capture on display 42. Face image extractor 46 may have functions of camera image capture, face detection, face size check, and face cutout, similarly to face image extractor 22 of face authentication machine 1 described above.

Specific information acquirer 47 has an optical character recognition (OCR) function, and generates specific information (here, business card description information) from characters and symbols extracted from a captured image by information acquisition camera 41B.

Registration requestor 48 transmits a user registration request to face management server 5 by communicator 43.

GUI controller 49 displays various guidance screens for the user distributed from face management server 5 on display 42. In addition, the input information is acquired and the screen is controlled according to the input operation of the user using the input function of display 42 (here, touch panel).

Operation status monitor 50 monitors the operation status of the master device and notifies face management server 5 of the operation status of the master device.

Figure 9:
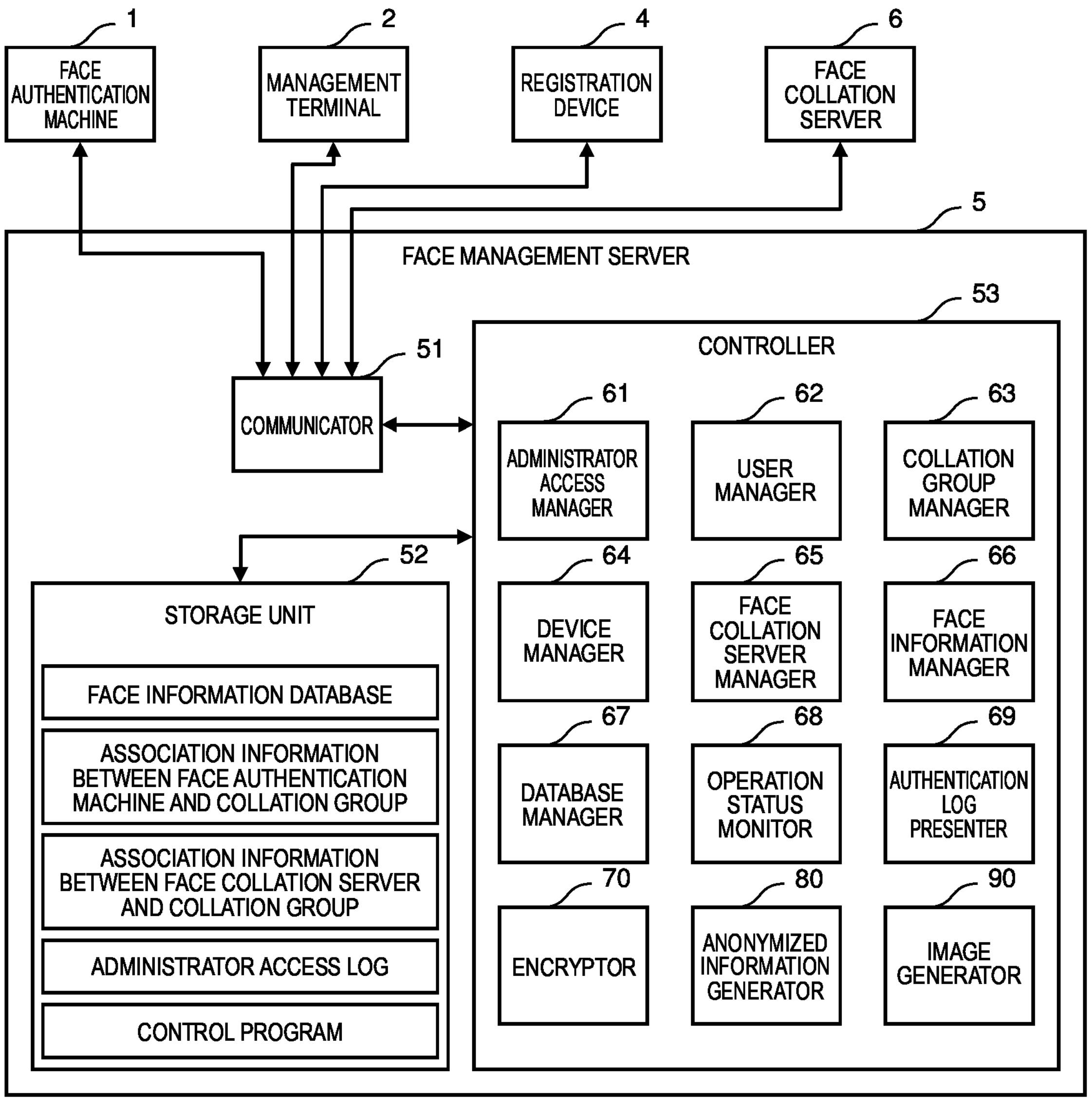
FIG. 9 is a block diagram illustrating a schematic configuration of face management server 5.

Next, a schematic configuration of face management server 5 will be described. FIG. 9 is a block diagram illustrating the schematic configuration of face management server 5.

Face management server 5 is provided with communicator 51, storage unit 52, and controller 53.

Communicator 51 communicates with management terminal 2 via the network. In addition, communicator 51 communicates with face authentication machine 1 via the network. In addition, communicator 51 communicates with registration device 4. In addition, communicator 51 communicates with face collation server 6.

Storage unit 52 stores a face information database, a database related to the association information between face authentication machine 1 and the collation group, a database related to the association information between face collation server 6 and the collation group, an administrator access log, and a control program performed by the processors constituting controller 53.

In the face information database, face images for registration are accumulated as information on each registered user. In addition, in the face information database, specific information of each user is accumulated in association with the face image for registration. In addition, a collation group and the like are registered in the face information database. The face image of the user and specific information may be stored in an encrypted state for privacy protection. Furthermore, the face information database may store a part of the face image of the user and specific information in a state of being replaced with anonymized information.

Controller 53 is provided with administrator access manager 61, user manager 62, collation group manager 63, device manager 64, face collation server manager 65, face information manager 66, database manager 67, operation status monitor 68, authentication log presenter 69, encryptor 70, anonymized information generator 80, and image generator 90. Controller 53 includes a processor, and each part of controller 53 is realized by performing a program stored in storage unit 52 by the processor. Each part of controller 53 is configured as a web application programming interface (Web API).

Administrator access manager 61 permits or denies the access (login) of the administrator according to the access authority of the administrator who accesses the master device from management terminal 2. Administrator access manager 61 monitors the status of access (login) from management terminal 2 to face management server 5 and face collation server 6, and when an access from management terminal 2 is detected, records information on the access (accessed administrator, date and time, and the like) as an administrator access log (history information). As a result, face management server 5 provides the administrator access log to management terminal 2 in response to the request for reference of the administrator access log from management terminal 2, and the administrator can view the administrator access log.

In addition, administrator access manager 61 manages access to the master device from management terminal 2, and when the administrator operates management terminal 2 to access the master device, information at that time is accumulated on storage unit 52 as an administrator access log (history information). In addition, the administrator access log is presented to management terminal 2 in response to the reference request from management terminal 2.

User manager 62 manages information on the user such as a face image for registration and specific information, and performs necessary processing for the user in response to a request from management terminal 2. In the present exemplary embodiment, management terminal 2 requests registration, reference, update, and deletion for the user, and user manager 62 performs necessary processing in response to the request. In addition, user manager 62 manages information on the conference attended by the user and information on the personal connections of the user.

Collation group manager 63 manages information on the collation group, and performs necessary processing related to the collation group in response to a request from management terminal 2. In the present exemplary embodiment, management terminal 2 requests registration, reference, update, and deletion of the collation group, and collation group manager 63 performs necessary processing in response to the request. In addition, the collation group information, that is, information required for face authentication machine 1 to request the face authentication to face collation server 6 that matches the own collation group is generated for each face authentication machine 1, and the collation group information is provided to face authentication machine 1.

Device manager 64 manages information on face authentication machine 1 and registration device 4, and performs necessary processing related to face authentication machine 1 and registration device 4 in response to a request from management terminal 2. In the present exemplary embodiment, management terminal 2 requests registration, reference, update, and deletion related to the association between face authentication machine 1 and the collation group, and device manager 64 performs necessary processing in response to the request.

Face collation server manager 65 manages information on face collation server 6 and performs necessary processing related to face collation server 6 in response to a request from management terminal 2. In the present exemplary embodiment, management terminal 2 requests registration, reference, and deletion related to the association between face collation server 6 and the collation group, and face collation server manager 65 performs necessary processing in response to the request.

Face information manager 66 synchronizes face information so that the face information of the user (face image, specific information, and the like) stored in the master device and the face information of the user (face feature data of the user) stored in face collation server 6 are maintained in a consistent state. In addition, face information manager 66 copies the face information (face feature data of the user).

Database manager 67 manages the database provided in the master device, and backs up and restores the database.

Operation status monitor 68 monitors the operation status of the master device, receives notification of the operation status from face authentication machine 1, registration device 4, and face collation server 6, and displays the operation status of face authentication machine 1, registration device 4, the master device (face management server 5), and face collation server 6 on the screen of management terminal 2 in response to operation of the administrator on management terminal 2.

Authentication log presenter 69 acquires the authentication log from face collation server 6 in response to the reference request from management terminal 2, and presents the authentication log to management terminal 2.

Encryptor 70 can perform encryption processing on at least a part of the face image of the user and specific information. The encrypted information is stored in storage unit 52. Face management server 5 may delete original information (information before encryption processing) corresponding to the information encrypted by encryptor 70 from storage unit 52.

Anonymized information generator 80 can perform processing of anonymizing at least a part of the face image of the user and specific information. As the anonymization processing, anonymized information generator 80 can replace a part of the face image of the user and specific information with dummy information, for example. In addition, in the anonymization processing, the dummy information may be used for information missing in the face image of the user and specific information (for example, information refused to be provided by the user). The anonymized information is stored in storage unit 52. Encryptor 70 may encrypt only the original information (information before anonymization processing) corresponding to the information anonymized by anonymized information generator 80.

Image generator 90 generates a management screen for the administrator to confirm or change the information management status by user manager 62 and device manager 64. The management screen is distributed to management terminal 2 and the like.

Figure 10:
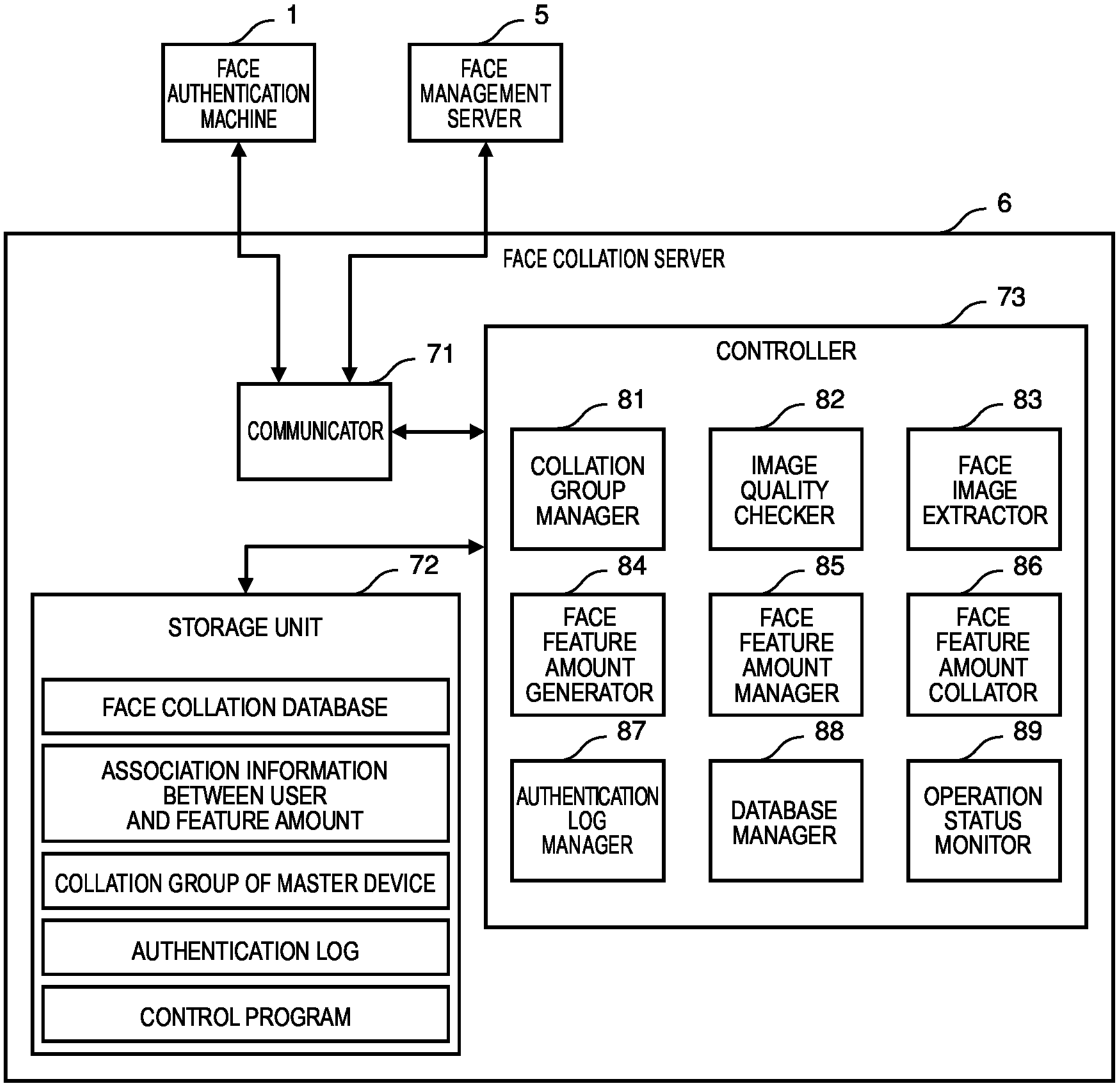
FIG. 10 is a block diagram illustrating a schematic configuration of face collation server 6.

Next, a schematic configuration of face collation server 6 will be described. FIG. 10 is a block diagram illustrating the schematic configuration of face collation server 6.

Face collation server 6 is provided with communicator 71, storage unit 72, and controller 73.

Communicator 71 communicates with face authentication machine 1 via the network. In the present exemplary embodiment, face image data and the like are received from face authentication machine 1. In addition, the authentication result of the user and the like are transmitted to face authentication machine 1. In addition, communicator 71 communicates with face management server 5 via the network. In the present exemplary embodiment, requests for various processing are received from face management server 5, and responses corresponding to the requests are transmitted to face management server 5.

Storage unit 72 stores the face collation database, the association information between the user and the feature amount, the information on the collation group of the master device, the authentication log, the control program performed by the processor constituting controller 73, and the like.

In the face collation database, user face feature data and the like are registered as information on each registered user. In addition, the face collation database is provided for each collation group, and the face feature data of the user is stored for each group. Here, the face feature data of the registered user may be backed up and stored in a non-volatile memory such as a hard disk drive (HDD) and a solid state drive (SSD) provided in face collation server 6 in preparation for unexpected disappearance from the face collation database.

Controller 73 is provided with collation group manager 81, image quality checker 82, face image extractor 83, face feature amount generator 84, face feature amount manager 85, face feature amount collator 86, authentication log manager 87, database manager 88, and operation status monitor 89. Controller 73 includes a processor, and each part of controller 73 is realized by performing a program stored in storage unit 72 by the processor. Each part of controller 73 is configured as Web API.

Collation group manager 81 manages the collation group to which the master device belongs, and performs registration or deletion processing related to the collation group in response to the request from face management server 5.

Image quality checker 82 determines whether or not the image of the face region in the captured image satisfies a predetermined quality. Specifically, the presence or absence of wearing a mask and the presence or absence of wearing sunglasses are detected from a target image, and the face authentication suitability (evaluation value based on face orientation and facial expression) is calculated.

Face image extractor 83 extracts a face image from the captured image of the user acquired by registration device 4 at the time of user registration. At this time, if necessary, face image extractor 83 detects a face of a person from the captured image (face detection), determines whether the detected face size is appropriate (face size check), cuts out a face region from the captured image (face cutout), and acquires a face image of the person. Face image extractor 83 can also extract a face image from the captured image of the target person acquired by face authentication machine 1 at the time of face authentication.

At the time of user registration and face authentication, face feature amount generator 84 detects face feature points from the data of the face image for registration and the face image for authentication and generates face feature data, respectively.

At the time of user registration, face feature amount manager 85 registers the face feature data of the user generated by face feature amount generator 84 on the face collation database corresponding to the collation group of the user. In addition, when updating or deleting, the face feature data registered on the face collation database is deleted in response to a request from face management server 5. In addition, in a case where the version of the program related to the face feature amount generation and the face collation algorithm is upgraded, the face feature data registered on the face collation database is updated so as to correspond to the new program in response to the request from face management server 5.

At the time of face authentication, face feature amount collator 86 compares the face feature data of the target person generated from the face image data for authentication acquired from face authentication machine 1 with the face feature data of the registrant (registered user) stored in the master device, and determines whether or not the target person is the registrant. Face feature amount collator 86 corresponds to a collation group associated with the master device, and in a case where a plurality of collation groups are associated with the master device, a plurality of face feature amount collators 86 for each collation group are included. Face feature amount collator 86 (face collation process) constitutes the face collation unit in combination with the face collation database.

Face feature amount collator 86 calculates the degree of similarity (collation score) between the target person and the registrant. By comparing this similarity with a predetermined threshold value, the success or failure of face authentication can be determined. In addition to notifying face authentication machine 1 of the success or failure determination result as a collation result, face authentication machine 1 may be notified of the person ID and the degree of similarity of the registrant having a high degree of similarity as the collation result.

When face authentication machine 1 requests the master device for face authentication, authentication log manager 87 accumulates the information at that time, that is, information such as the device ID of face authentication machine 1 as a request source for the face authentication and the face collation result on storage unit 72 as an authentication log. In addition, the authentication log is provided to face management server 5 in response to the request from face management server 5.

Database manager 88 manages the database provided in the master device, and backs up and restores the database.

Operation status monitor 89 monitors the operation status of the master device and notifies face management server 5 of the operation status of the master device.

In the present exemplary embodiment, each of the functions of face image extraction, face feature amount generation, and face feature amount collation is provided as the main functions of face collation server 6, and these functions can be configured by different information processing devices that are independent of each other. For example, the face image extraction function may be configured by another information processing device independent of other functions such as face feature amount generation and face feature amount collation.

Figure 11:
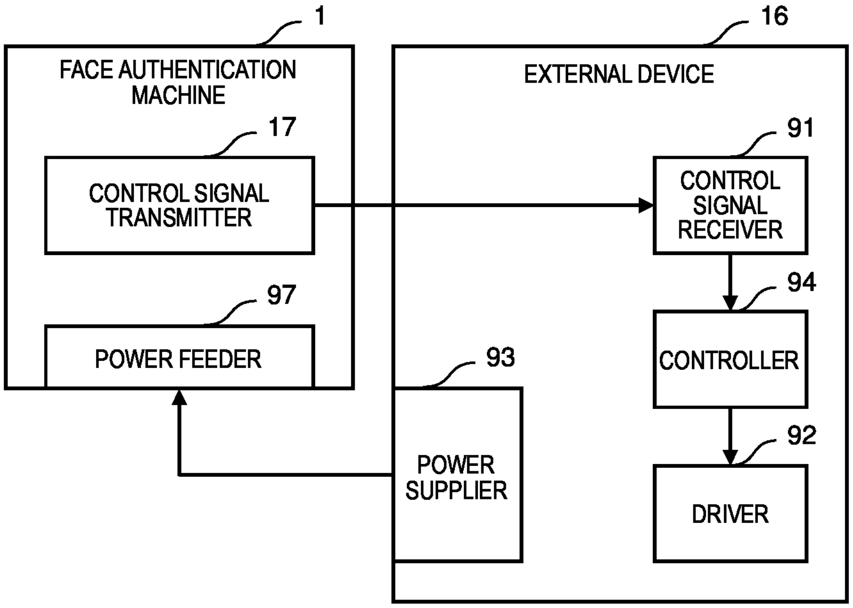
FIG. 11 is a block diagram illustrating a schematic configuration of an external device.

Next, a schematic configuration of external device 16 will be described. FIG. 11 is a block diagram illustrating the schematic configuration of external device 16.

External device 16 is provided with control signal receiver 91, driver 92, power supplier 93, and controller 94.

Control signal receiver 91 receives the control signal (operation command from face authentication machine 1 cooperating with external device 16) transmitted from control signal transmitter 17 of face authentication machine 1.

Driver 92 is controlled by controller 94 based on the control signal from face authentication machine 1. For example, in a case where external device 16 is a gate device, driver 92 supplies power for opening (or closing) the door of the gate device. In addition, in a case where external device 16 is a lock device for the door, driver 92 supplies power for locking (or unlocking) the lock device. In the case where external device 16 is a device that does not have a portion to be driven (for example, payment terminal device), driver 92 can be omitted.

Power supplier 93 supplies electric power to each part of external device 16. In addition, power supplier 93 is electrically connected to power feeder 97 of face authentication machine 1, and can supply electric power to power feeder 97 as well. Power feeder 97 supplies electric power to each part of face authentication machine 1. In addition, by connecting to power feeder 97 of face authentication machine 1 via a local area network (LAN) cable, power can be supplied to power feeder 97 by power over Ethernet (PoE) feeding.

In addition, power supplier 93 can receive power supply from an uninterruptible power supply device (or emergency power supply) independent of the power supply line in the entire facility. As a result, for example, the gate device as external device 16 can perform normal operation even in a case where a power failure is generated in the facility, and has an advantage that the security of the facility can be maintained.

Controller 94 controls the operation of each part of external device 16. In addition, controller 94 can perform the necessary processing as external device 16. Controller 94 includes a processor, and is realized by performing a program stored in a storage unit (memory) (not illustrated) by the processor.

Figure 12:
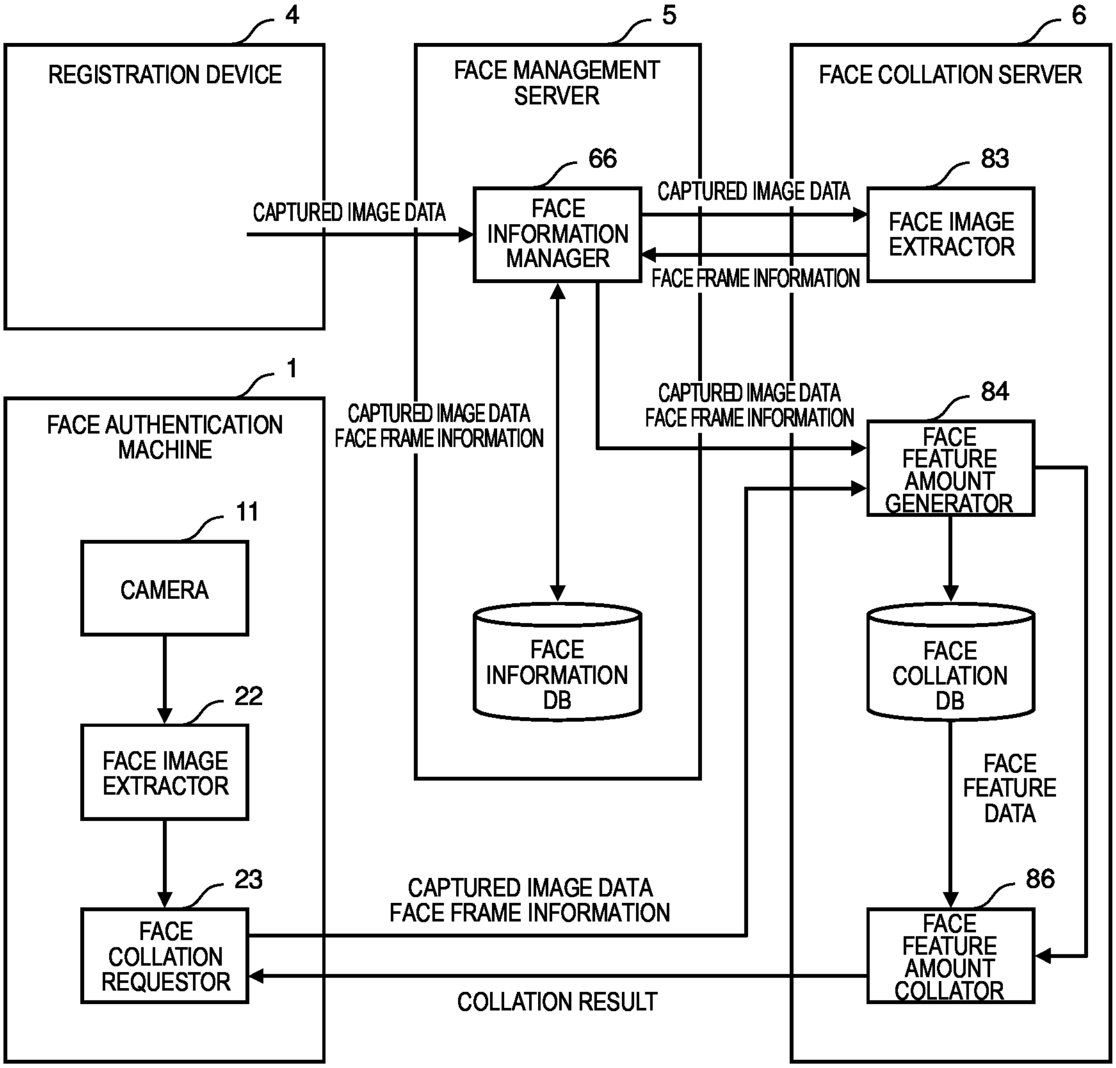
FIG. 12 is an explanatory diagram illustrating an outline of face image extraction processing.

Next, face image extraction processing will be described. FIG. 12 is an explanatory diagram illustrating an outline of the face image extraction processing.

As described above, face image extractor 22 of face authentication machine 1 performs face image extraction processing, that is, processing of generating face image data from the captured image data of the user by each processing of face detection, face size check, and face cutout, and the face image extraction processing is similarly performed in face image extractor 83 of face collation server 6.

At the time of user registration, registration device 4 sends the data of the captured image of the user to face collation server 6 via face management server 5, so that face image extractor 83 of face collation server 6 performs the face image extraction processing. In some cases, the data of the captured image of the user may be sent from management terminal 2 to face collation server 6 via face management server 5.

On the other hand, at the time of face authentication, it is preferable that the face image extraction processing is performed only by face authentication machine 1 and the face image extraction processing is not performed by face collation server 6. In this case, face authentication machine 1 is provided with a highly accurate face detection function. In addition, face authentication machine 1 normally captures the capturing area with camera 11, and sends face image information (captured image data and face frame information) to face collation server 6 at the timing when the face is detected. As a result, the load of the face image extraction processing is distributed to the plurality of face authentication machines 1, and the load of face collation server 6 can be reduced. In addition, since the amount of communication can be reduced, the load on the network can be reduced. Since the face authentication response can be performed at high speed, the face authentication of the target person appearing one after another can be efficiently performed.

That is, by sharing the face authentication processing of the user between face authentication machine 1 and face collation server 6, it is not necessary to provide a large number of expensive authentication machines in which all the face authentication processing of the user is concentrated on face authentication machine 1 as in the case in the related art. In addition, even when the face feature data is updated, the maintenance work of the large-scale authentication machine is not required, and the work on face collation server 6 is sufficient. Therefore, according to the present exemplary embodiment, it is possible to construct a face authentication system having an inexpensive configuration and excellent workability.

However, face authentication machine 1 may not be provided with the face image extraction function, that is, face authentication machine 1 may not be provided with face image extractor 22.

Figure 13:
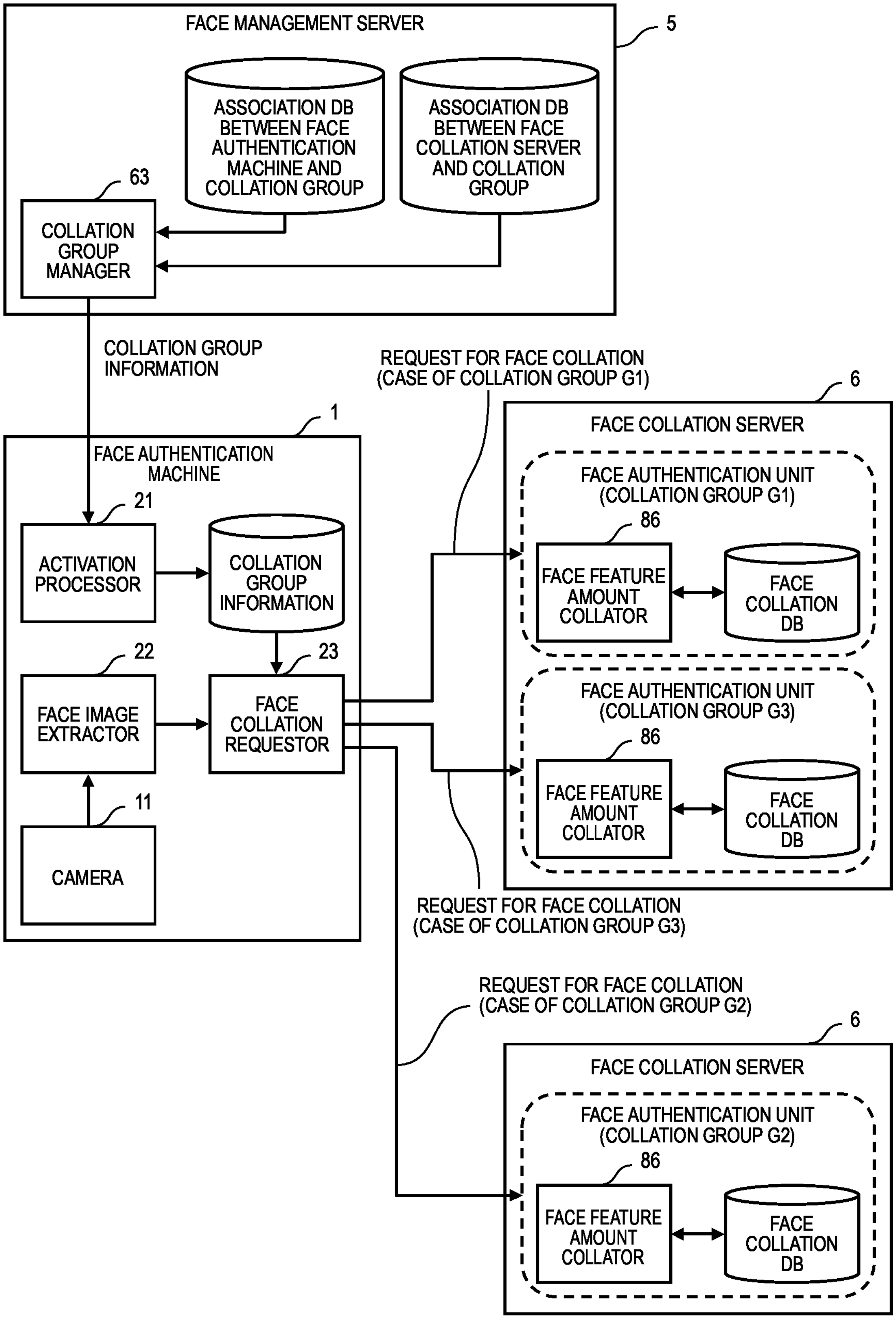
FIG. 13 is an explanatory diagram illustrating an outline of an inquiry for face authentication using collation group information.

FIG. 13 is an explanatory diagram illustrating an outline of an inquiry for face authentication using collation group information.

Face management server 5 holds information on the collation group to which the user belongs, the association information between face authentication machine 1 and the collation group, and the association information between face collation server 6 and the collation group. In addition, in collation group manager 63 of face management server 5, collation group information is generated for each face authentication machine 1 based on the association information between face authentication machine 1 and the collation group and the association information between face collation server 6 and the collation group.

The collation group information is information required for face authentication machine 1 to request face authentication to face collation server 6 that matches the own collation group. The collation group information includes identification information (group number) of the collation group to which face authentication machine 1 belongs and destination information of face collation server 6 to which face authentication is requested from face authentication machine 1, that is, face collation server 6 corresponding to the collation group with face authentication machine 1. Here, the destination information is specifically the network address (for example, IP address) of face collation server 6, face collation server 6 that is the request destination for face authentication is specified by the destination information, and face authentication machine 1 and face collation server 6 that is the request destination for the face authentication are associated with each other. In a case where face authentication machine 1 belongs to the plurality of collation groups, the address (IP address) for each of the corresponding plurality of face collation servers 6 is included in the collation group information.

In face authentication machine 1, activation processor 21 acquires collation group information from face management server 5 as operation setting information and stores the collation group information on the master device at the time of activation or the like. In face authentication machine 1, when the face of a person is detected, a request for face collation is sent to face collation server 6 that matches the collation group to which the master device belongs. The request for face collation includes information on the collation group to which the master device belongs.

In face authentication machine 1, the timing of acquiring the setting information on the collation group information and the like from face management server 5 may be periodic at a predetermined timing or at a predetermined interval in addition to the time of activation, or a configuration in which the collation group information is distributed from face management server 5 may be adopted.

Face collation server 6 holds the association information between the face collation process of the master device and the collation group. When face collation server 6 receives the face authentication request from face authentication machine 1, face collation server 6 specifies a face authentication process corresponding to face authentication machine 1 and causes the face authentication process to perform face collation, based on the association information between the collation group and the face authentication process and the collation group obtained from face authentication machine 1. As a result, face collation processing is performed in the face authentication process corresponding to the designated collation group.

Incidentally, in the present exemplary embodiment, in face collation server 6, a face collation database is provided for each collation group, and face feature data is stored for each collation group. Therefore, at the time of face collation, the face collation may be performed on the face feature data registered on the face collation database corresponding to the collation group of face authentication machine 1. On the other hand, face collation server 6 may perform collation regardless of the collation group of face authentication machine 1, and then filter the collation result. That is, the face collation is performed on the face feature data of all users stored in face collation server 6, and then only the collation result with the user belonging to the collation group of face authentication machine 1 may be extracted. In this case, the face collation database may not be provided separately for each collation group.

Next, a registration operation by the user in registration device 4 will be described. FIG. 14 is an explanatory diagram illustrating an example of the registration screen displayed on registration device 4.

When starting to use the facility (or in a case where the facility is not revisited within a predetermined period after registration), the user can perform a registration operation for authentication by registration device 4. In the present exemplary embodiment, the user can perform the registration operation according to the guidance screen displayed on display 42 (here, touch panel) of registration device 4. A part of the registration operation for authentication (such as pressing a button) described later may be performed by a receptionist obtained the agreement of the user.

Display 42 of registration device 4 displays an initial screen on which registration start button 101 is displayed (refer to (A) in FIG. 14). Therefore, when the user presses (touches) registration start button 101, a description related to the handling of personal information in the face authentication system and a screen requesting the user for the agreement are displayed (refer to (B) in FIG. 14).

By pressing agree button 102 on the screen (B) in FIG. 14, the user can agree to the handling of personal information in the face authentication system. As a result, registration device 4 starts acquiring authentication information of the user. Therefore, display 42 displays a screen (first screen) illustrating a method of acquiring specific information used for specifying the user (refer to (C) in FIG. 14). The user can stop the registration operation by pressing stop button 103. The screen for asking the user for the agreement may not require the agreement depending on the user and can be omitted. In addition, the agreement may be replaced by the operation of capturing button 104, capturing button 107, and registration button 111, which will be described later. In addition, the agreement may be obtained by a predetermined procedure before using registration device 4.

In the example illustrated in (C) in FIG. 14, a screen (first screen) illustrating a method of capturing a business card of the user (here, guide for placing the business card of the user in the capturing area of information acquisition camera 41B) is displayed. Therefore, when the user places the business card on placing table 116 of registration device 4 and presses capturing button 104, the business card is captured by registration device 4. The user can stop the capturing of the business card by pressing stop button 105.

When the capturing of the business card is completed, registration device 4 subsequently displays a screen (first screen) illustrating a method of capturing a face image for user registration (guidance for positioning the face of the user in the capturing area of face capturing camera 41A) (refer to (D) in FIG. 14). At this time, registration device 4 can prompt the user to align the face by blinking capturing frame 106 corresponding to the capturing area. A live image (real-time moving image) captured by face capturing camera 41A is displayed in capturing frame 106. Therefore, when the user positions his or her face in the capturing frame and presses capturing button 107, the capturing of the face of the user is performed by registration device 4. At this time, registration device 4 can generate a shutter sound when capturing button 107 is pressed. The user can stop the capturing of the face by pressing stop button 108.

When the face capturing is completed, registration device 4 subsequently displays a screen (first screen) for the user to confirm a captured face image (refer to (E) in FIG. 14). The captured face image (still image) is displayed on the screen, and the user presses registration button 111 in a case where it is determined that there is no problem with the captured face image. On the other hand, the user can press re-capturing button 112 in a case where it is determined that there is a problem with the captured face image. As a result, the screen illustrated in (D) in FIG. 14 is displayed on registration device 4, and the face can be re-captured. The user can stop the capturing of the face by pressing stop button 113.

When the face capturing is completed, the acquired face image and specific information (here, including the business card image and business card description information extracted from the business card image by OCR) are transmitted to face management server 5. In this case, at least one of the face image and the business card image may be transmitted to face management server 5 to the user who does not want to provide both the face image and the business card image. As a result, face management server 5 performs registration processing (refer to FIG. 15) related to the user. When the registration processing of face management server 5 is normally completed, registration device 4 displays a screen (second screen) indicating that the registration is completed (refer to (F) in FIG. 14 and "displaying the processing result on the screen" in FIG. 15"). Therefore, when the user presses completion button 115, the registration operation in registration device 4 is completed. The order of acquiring the face image and the business card image may be reversed.

After the registration operation is completed, registration device 4 can delete the face image and the specific information stored in storage unit 44. As a result, it is possible to prevent the personal information from being stored in registration device 4 used by an unspecified person for a long period of time, and to manage the personal information of the user more safely.

Instead of registering the user by registration device 4 described above, the administrator can register the user by using management terminal 2 after preparing the face image file for user registration in advance. In addition, the administrator can also modify the authentication information registered by registration device 4 or add new information from management terminal 2 in order to supplement the registration by registration device 4.

Figure 15:
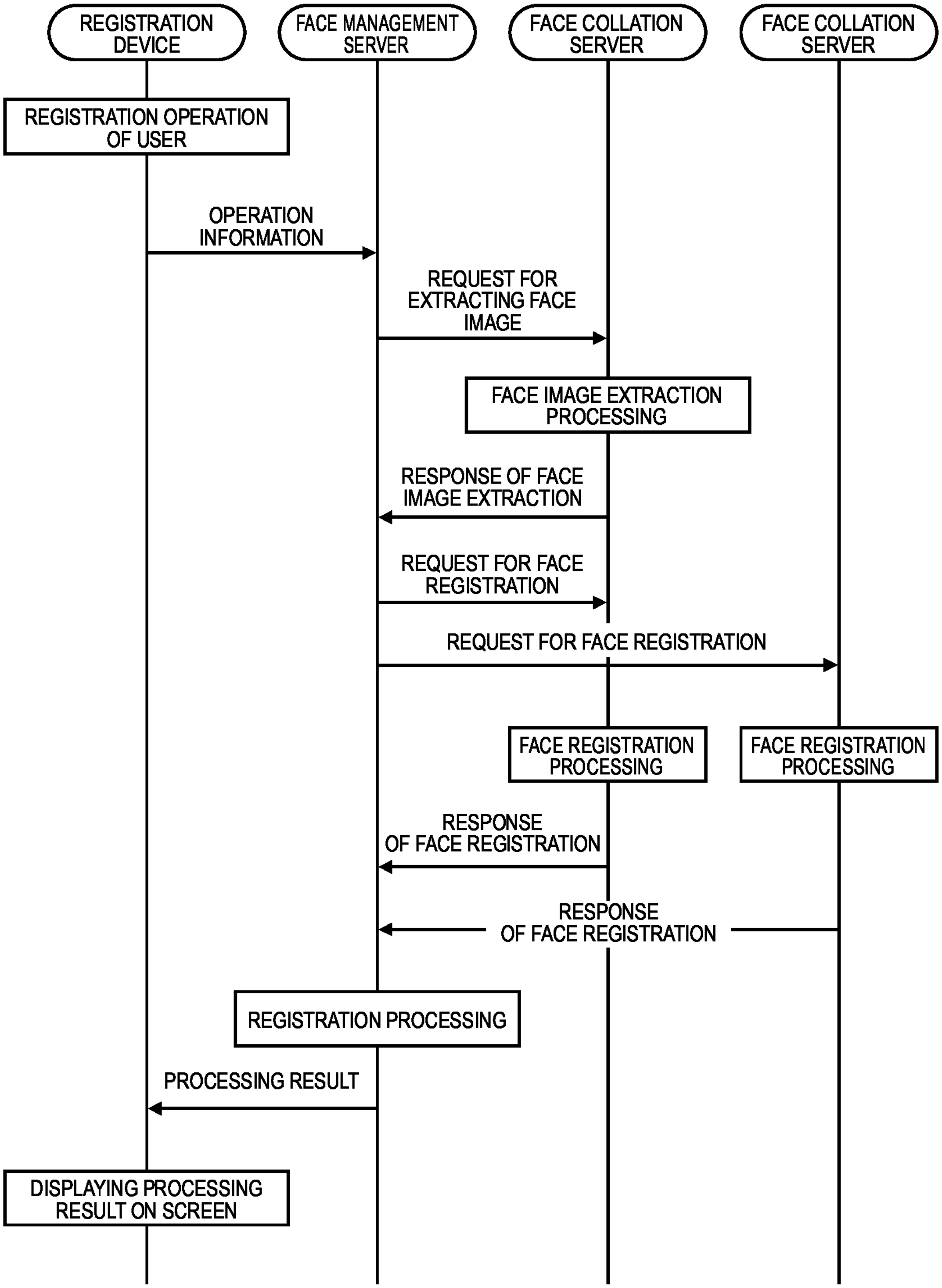
FIG. 15 is a sequence diagram illustrating a procedure of registration processing for a user.

Next, registration processing for the user performed in response to the above-described registration operation of the user will be described. FIG. 15 is a sequence diagram illustrating a procedure of the registration processing for the user.

When the registration operation of the user is performed in registration device 4 as described above, face management server 5 starts the registration processing for the user as illustrated in FIG. 15. At this time, face management server 5 receives the captured image of the face and specific information from registration device 4 as well as the operation information of the user. In the registration processing, face management server 5 first sends a request for extracting the face image to face collation server 6 in which the target user and the collation group match. The request includes the captured image of the face of the user acquired from registration device 4. At this time, in a case where there are a plurality of face collation servers 6 in which the target user and the collation group match, one face collation server 6 is selected and a request for extracting the face image is sent to one face collation server 6.

When face collation server 6 receives the request for extracting the face image from face management server 5, face collation server 6 performs face image extraction processing. In the face image extraction processing, the captured image of the face of the user acquired from face management server 5 is subjected to processing such as face detection and face cutout to extract the face image of the user. A response of the face image extraction is sent to face management server 5. The response includes the face image of the user.

When face management server 5 receives the response of the face image extraction from face collation server 6, face management server 5 sends a request for face registration to face collation server 6 in which the target user and the collation group match. The request can include the face image of the user acquired from specific face collation server 6. At this time, in a case where there are a plurality of face collation servers 6 in which the target user and the collation group match, the request for face registration is sent to all (two in FIG. 15) face collation servers 6 including the face image of the user acquired from specific face collation server 6.

Face management server 5 may omit the above-described request for extracting the face image to face collation server 6, and may add a captured image of the face of the user acquired from registration device 4 as well as the operation information to the request for face registration to face collation server 6.

When face collation server 6 receives the request for face registration from face management server 5, face registration processing is performed. In the face registration processing, a face feature amount is generated from the face image of the user, and the face feature amount is registered on the database. At this time, a face registration ID is assigned in association with the face feature amount of the user. A response of the face registration is sent to face management server 5. The response includes a result indicating whether or not the face registration is normally completed and the face registration ID. With the completion of registration of the face feature amount on the database, the face image of the user on face collation server 6 is deleted. In addition, the face feature data may be backed up and stored in a non-volatile memory such as HDD and SSD managed separately from the face collation DB of face collation server 6.

Face management server 5 receives the response of the face registration from face collation server 6, and in a case where the processing is completed normally, the registration processing for the user is performed. In the registration processing, the face image of the user acquired from registration device 4 is registered on the face information database. In addition, face management server 5 registers the specific information of the user acquired from face collation server 6 on the face information database in association with the face image. In addition, face management server 5 registers the face registration ID issued by face collation server 6 on the face information database as user information.

Figure 16:
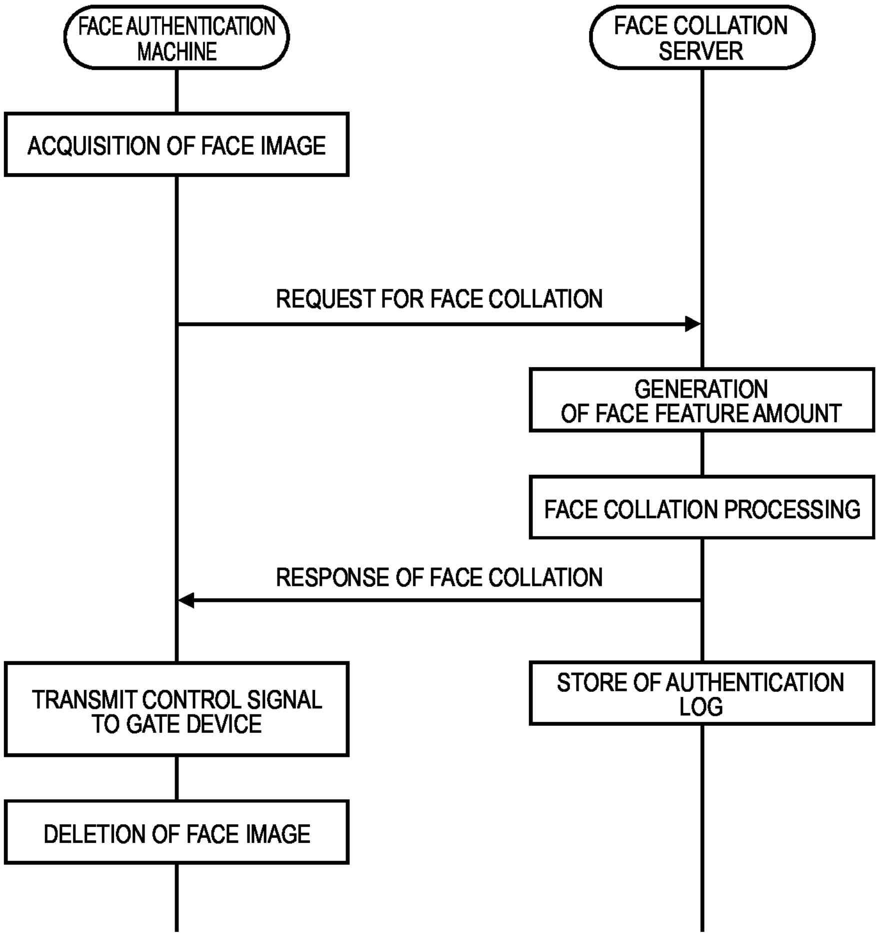
FIG. 16 is a sequence diagram illustrating a first example of face authentication processing for the user.

Next, processing of face authentication of the user in face authentication machine 1 will be described. FIG. 16 illustrates a first example of the face authentication processing for the user. Here, an example is illustrated in which a gate device (security gate) that manages the passage of the user is used as external device 16 cooperating with face authentication machine 1.

When face authentication machine 1 detects a person's face from the captured image of camera 11 and acquires the face image, a request for face collation is transmitted to face collation server 6. The request for face collation includes the device ID of face authentication machine 1 as a request source, the collation group of face authentication machine 1, the data of the captured image (face image for authentication) of the target person for face authentication, the face frame Information, and collation conditions.

When face collation server 6 receives the request for face collation, face feature amount generator 84 first generates the face feature amount of the target person from the face image of the target person acquired from face authentication machine 1. Next, face feature amount collator 86 of the face authentication unit corresponding to the collation group of face authentication machine 1 collates the face feature amount of the target person with the face feature amount of the user registered on the face authentication database. At this time, the face collation processing is performed in the face authentication process in which the collation group matches face authentication machine 1 as a request source. When the face collation processing is completed, face collation server 6 transmits a response of the face collation to face authentication machine 1 as a request source. The response of the face collation includes the collation result (success or failure), the collation score, and a user code.

Face feature amount collator 86 calculates a collation score indicating the degree of similarity between the target person for face authentication and the registered user, and in a case where the collation score is equal to or higher than a predetermined reference value, considers the target person of face authentication as the registered user himself or herself to generate a collation result indicating that the face collation is successful. On the other hand, in a case where the collation scores for all users are not equal to or higher than the reference value, it is determined that the target person for face authentication is not a registered user, and a collation result indicating that face collation is failed is generated.

The face collation processing conditions (face collation parameters) performed by face collation server 6 may be added to the collation request. As a result, face authentication machine 1 can instruct the processing content of the face collation performed by face collation server 6. For example, as a processing condition for face collation, a threshold value for the collation score is designated, and a collation result having a collation score equal to or higher than a predetermined threshold value is included in the response. In addition, as a processing condition for face collation, the number of collation results is designated, and a predetermined number of collation results are included in the response from the higher collation score.

In addition, in face collation server 6, when the face collation is completed, authentication log manager 87 stores information such as the collation result acquired by the face collation as an authentication log (history information of face authentication) on the database. At this time, in addition to storing only the result of face authentication (success or failure) as an authentication log, the collation score may be included in the authentication log. In addition, the face image of the target person acquired from face authentication machine 1 may be included in the authentication log. In this case, the face image of the target person may be encrypted and stored.

In a case where a large number of valid collation results whose collation score exceeds the threshold value are obtained, the collation results may be narrowed down to a predetermined number of collation results from the higher collation score and stored as an authentication log. In addition, in a case where the face collation is not normally completed, or a valid collation result whose collation score exceeds the threshold value cannot be obtained, only the information included in the request from face authentication machine 1 may be stored as the authentication log.

In addition, when face authentication machine 1 receives the response of the face collation indicating the success of the face authentication from face collation server 6, face authentication machine 1 transmits an open/close control signal of the door to a cooperated gate device. That is, face authentication machine 1 functions as a control device (gate open/close control device) converting the response of the face collation into the open/close control signal of the door, and then controlling the operation of the door of the cooperated gate device. As a result, the gate device operates to open the door (that is, allow the user to pass through) by driver 92. Face authentication machine 1 deletes the face image of the user stored in storage unit 14 when the transmission of the control signal (open/close control signal) is completed. Here, although the response of the face collation is converted into the open/close control signal of the door, in a case where the open/close control of the door of the gate device is performed by an entry and exit management system constructed as an external system, a control signal is transmitted to the entry and exit management system so that the face authentication result is reflected in the open/close control of the gate device.

Figure 17:
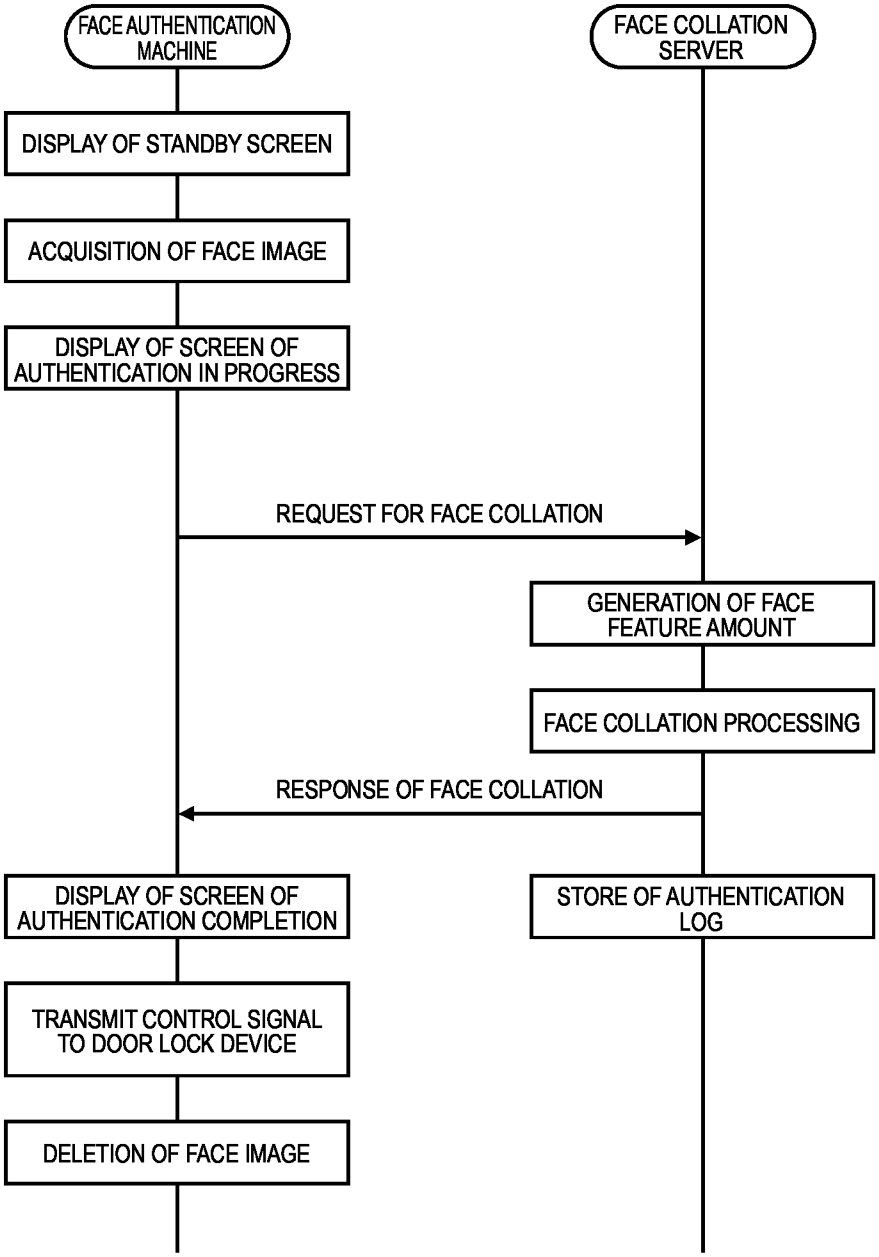
FIG. 17 is a sequence diagram illustrating a second example of face authentication processing for the user.
Figure 18A:
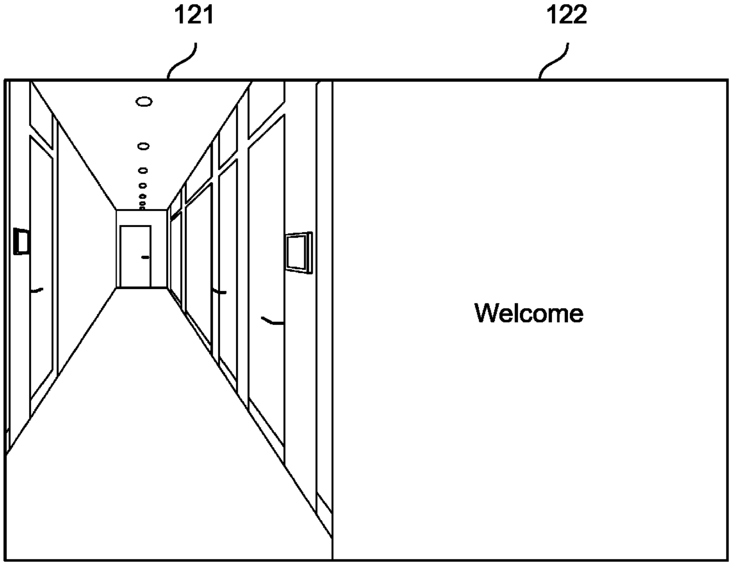
FIG. 18A is an explanatory diagram illustrating an example of an authentication screen displayed on face authentication machine 1.
Figure 18B:
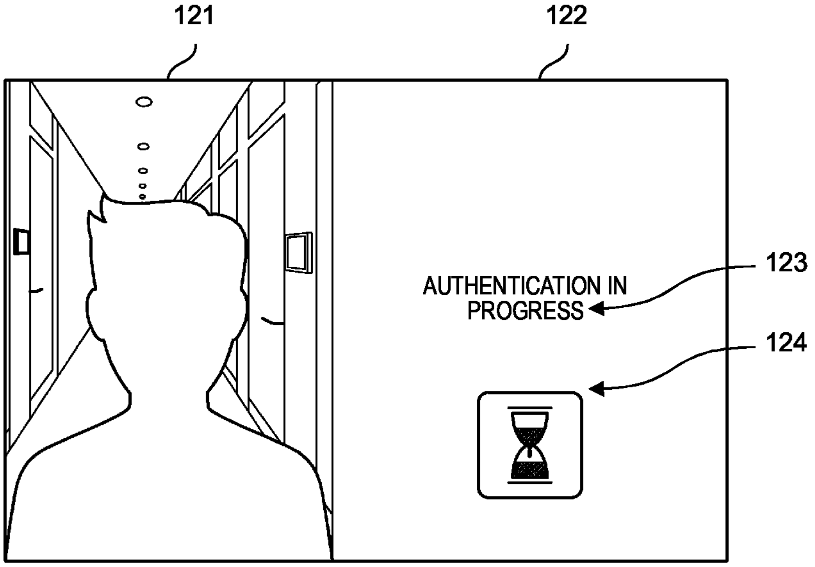
FIG. 18B is an explanatory diagram illustrating an example of an authentication screen displayed on face authentication machine 1.
Figure 18C:
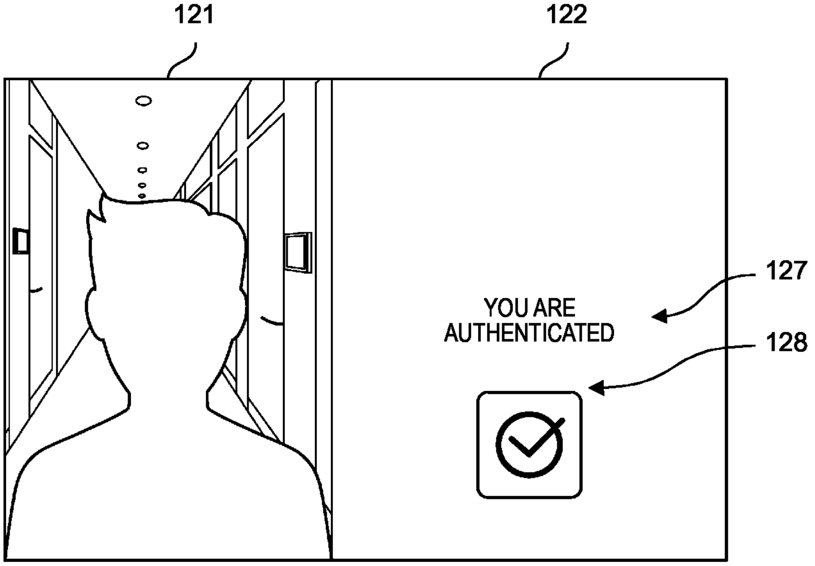
FIG. 18C is an explanatory diagram illustrating an example of an authentication screen displayed on face authentication machine 1.

FIG. 17 illustrates a second example of the face authentication processing for the user. FIGS. 18A, 18B, and 18C are explanatory diagrams illustrating an example of an authentication screen (screen at the time of authentication) displayed on face authentication machine 1. Here, an example is illustrated in which a lock device provided on the door of the conference room is used as external device 16 cooperating with face authentication machine 1. Related to the second example of the face authentication processing, detailed description of the same items as in the first example described above will be omitted.

Face authentication machine 1 is installed, for example, on the wall of a corridor facing the conference room. When face authentication machine 1 detects the approach of a person by a motion sensor or the like (that is, detects a user), face authentication machine 1 displays a standby screen (initial screen) of the authentication screen on display 12 (refer to FIG. 18A). Here, an authentication screen (notification screen) displayed on display 12 includes image display area 121 that displays a live image (real-time moving image) of a predetermined capturing area captured by camera 11, and information display area 122 that displays information indicating the progress of face authentication processing.

Thereafter, when the face of a person is detected from the captured image of camera 11 and the face image is acquired, face authentication machine 1 transmits a request for face collation to face collation server 6. At this time, characters 123 and graphic 124 indicating that the user authentication is in progress are displayed in information display area 122 (refer to FIG. 18B). In information display area 122, the display of one of characters 123 and graphic 124 may be omitted. In addition, in the case of face authentication machine 1 that does not have a display, for example, a light emitting diode (LED) lamp may be used to blink the LED when authentication is in progress and turn on the LED when the authentication succeeds to notify the progress of face authentication. In addition, the progress of face authentication may be notified by a display color of the LED. In addition, the display color of the LED may be changed depending on the success or failure of the face authentication of the user.

When face collation server 6 receives the request for face collation, face collation server 6 generates a face feature amount and performs the face collation processing similarly to the first example described above. When the face collation processing is completed, face collation server 6 transmits a response of the face collation to face authentication machine 1 as a request source.

In addition, when face authentication machine 1 receives the response of the face collation indicating the success of the face authentication from face collation server 6, characters 127 and graphic 128 indicating that the user authentication is completed are displayed in information display area 122 of the authentication screen (refer to FIG. 18C). At the same time, face authentication machine 1 transmits a control signal (command to unlock the door) to a cooperated lock device for the door. That is, face authentication machine 1 functions as a control device that controls the operation of the cooperated lock device. As a result, the lock device performs an operation of unlocking (that is, permitting the user to enter the room). Face authentication machine 1 deletes the face image of the user stored in storage unit 14 when the transmission of the control signal is completed.

Figure 19:
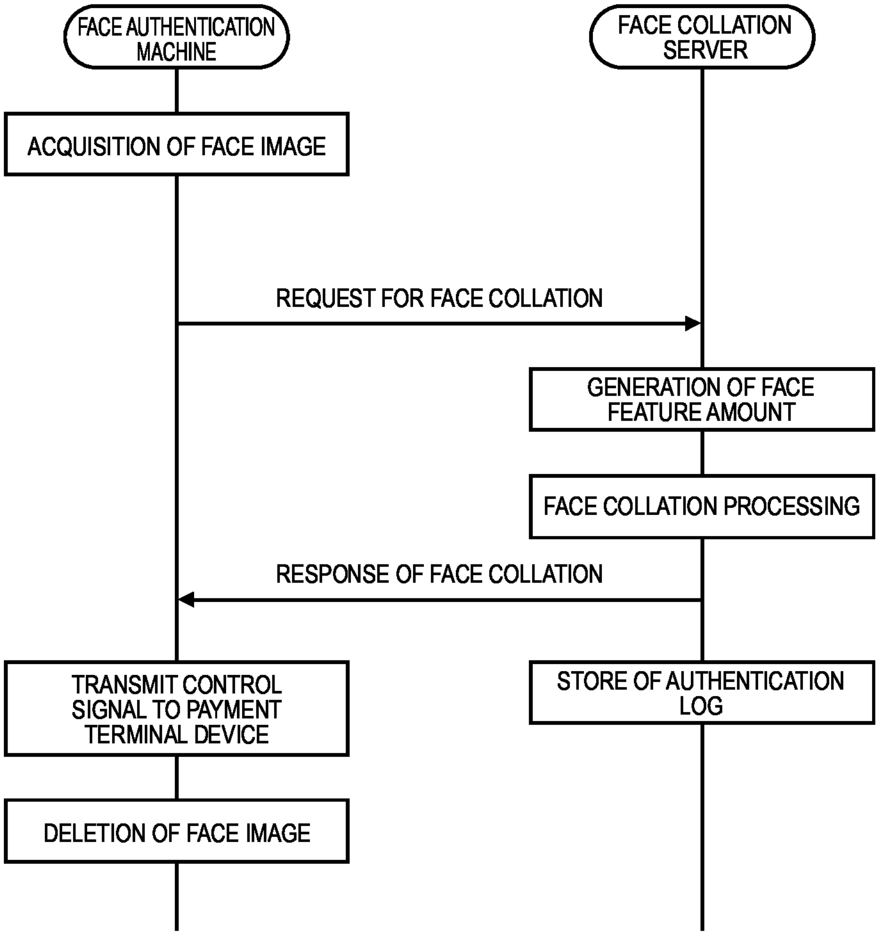
FIG. 19 is a sequence diagram illustrating a third example of face authentication processing for the user.

Face authentication machine 1 can be cooperated with an external device that only performs information processing without mechanical operation as the above-described gate device and the lock device for the door. FIG. 19 illustrates a third example of the face authentication processing for the user.

Here, an example in which a payment terminal device is used as external device 16 that cooperates with face authentication machine 1 is illustrated. Related to the third example of the face authentication processing, detailed description of the same items as in the first or second example described above will be omitted.

In the third example of the face authentication processing, when face authentication machine 1 receives the response of the face collation indicating the success of face authentication from face collation server 6, face authentication machine 1 transmits a control signal to a cooperated payment terminal device (or payment system). As a result, the payment terminal device performs processing of associating the usage fee data for the service used by the corresponding user (for example, providing meals at the restaurant) with the authenticated user, and thus, the usage fee is added to the billing data at the facility for the user.

Figure 20:
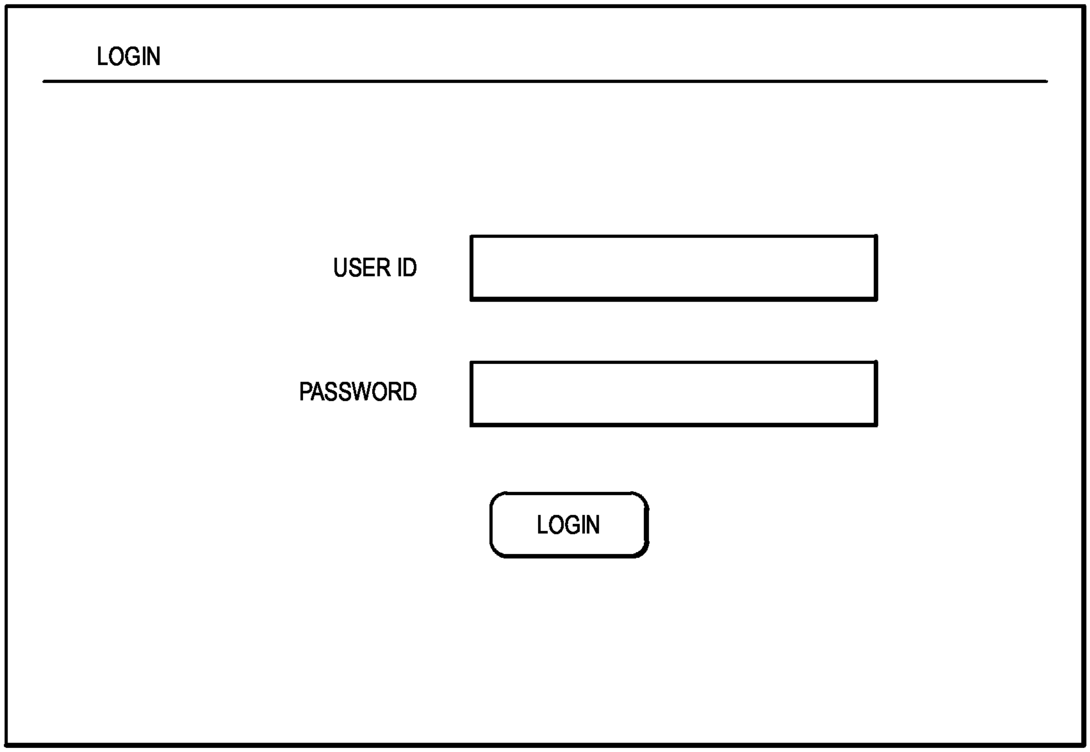
FIG. 20 is an explanatory diagram illustrating a login screen displayed on management terminal 2.

Next, a management work by the administrator of the face authentication system will be described. FIG. 20 is an explanatory diagram illustrating a login screen displayed on management terminal 2.

On management terminal 2, when the administrator activates the management application and accesses face management server 5, the login screen is displayed. On the login screen, the administrator can input his or her user ID and password. When the administrator inputs the user ID and password on the login screen and operates a login button, face management server 5 performs user authentication. In a case where the login succeeds, various management screens can be displayed. In a case where login fails, an error is displayed.

Figure 21A:
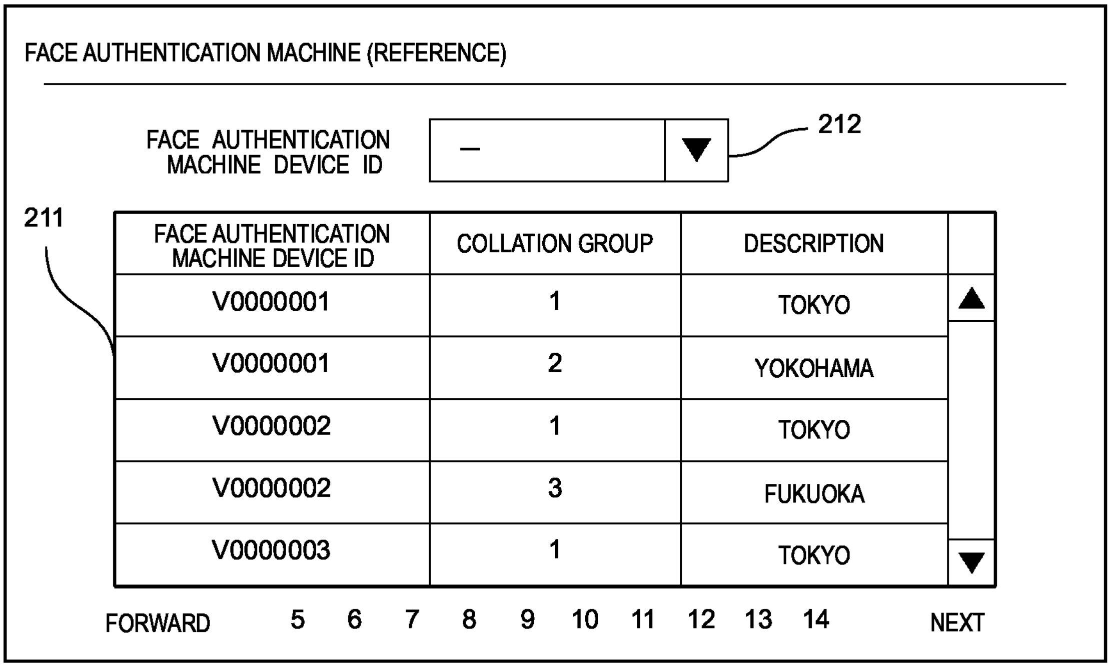
FIG. 21A is a screen displayed on management terminal 2 at the time of registration, reference, update, and deletion related to the association between face authentication machine 1 and the collation group.
Figure 21B:
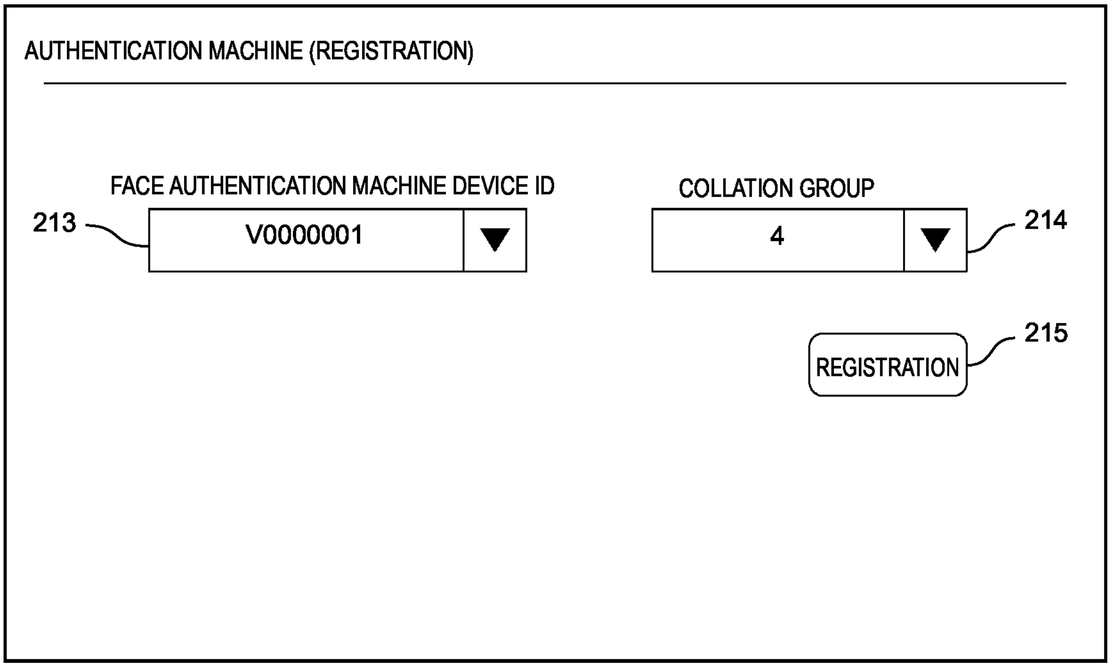
FIG. 21B is a screen displayed on management terminal 2 at the time of registration, reference, update, and deletion related to the association between face authentication machine 1 and the collation group.
Figure 22:
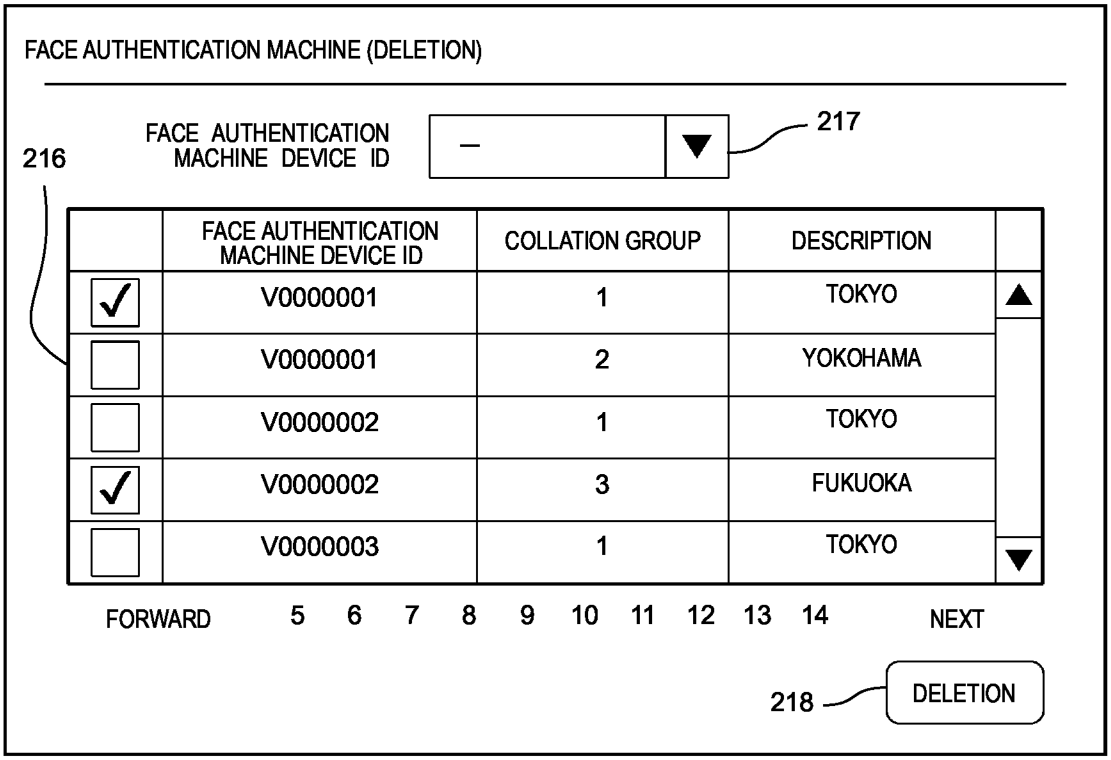
FIG. 22 is a screen displayed on management terminal 2 at the time of registration, reference, update, and deletion related to the association between face authentication machine 1 and the collation group.

Next, registration, reference, update, and deletion related to the association between face authentication machine 1 and the collation group in the system will be described. FIGS. 21A, 21B, and 22 are explanatory diagrams illustrating a management screen displayed on management terminal 2 at the time of registration, reference, update, and deletion related to the association between face authentication machine 1 and the collation group.

When management terminal 2 logs in to face management server 5, the reference screen illustrated in FIG. 21A, the registration screen illustrated in FIG. 21B, and the deletion screen illustrated in FIG. 22 can be displayed at the time of registration, reference, update, and deletion related to the association between face authentication machine 1 and the collation group.

The reference screen illustrated in FIG. 21A displays a list of association settings between registered face authentication machine 1 and the collation group. By viewing the reference screen, the administrator can confirm the registered contents of the collation group.

The reference screen is provided with list display unit 211 and face authentication machine designator 212. In list display unit 211, the device ID of each authentication machine, the collation group (number) associated with each authentication machine, and the description for the collation group are displayed. In face authentication machine designator 212, target face authentication machine 1 (device ID) can be selected from pull-down menu. As a result, the display content of list display unit 211 can be narrowed down to the specific face authentication machine 1, and only the collation group associated with specific face authentication machine 1 is displayed on list display unit 211. In a case where face authentication machine 1 is not designated by face authentication machine designator 212, information on all face authentication machines 1 is displayed on list display unit 211.

In addition, on the reference screen, items (device ID, face authentication machine 1, and description) can be designated and sorting can be performed. The number of items displayed by list display unit 211 (the number of face authentication machines 1) and the display range of face collation server 6 and the collation group may be designated. In addition, the search condition may be designated for each item (device ID, face authentication machine 1, and description) so that the search can be performed.

In the example illustrated in FIG. 21A, face authentication machine 1 is grouped according to the place where face authentication machine 1 is installed (for example, the location of the business establishment). The registration screen illustrated in FIG. 21B is for setting the association between face authentication machine 1 and the collation group. Information that associates the collation group with the authentication machine can be registered.

The registration screen is provided with authentication machine designator 213, collation group designator 214, and registration button 215. In authentication machine designator 213, target face authentication machine 1 (device ID) can be selected from the pull-down menu. In collation group designator 214, the collation group of target face authentication machine 1 can be selected from the pull-down menu.

The pull-down menu displays the collation groups already registered. When registration button 215 is operated after inputting face authentication machine 1 and the collation group on the registration screen, face management server 5 performs processing of registering the collation group information on the input contents.

Although, in some cases, a plurality of collation groups are associated with one face authentication machine 1, in this case, the registration operation of associating one collation group with one face authentication machine 1 may be repeated on the registration screen. In addition, a plurality of collation group designators 214 may be provided on the registration screen.

The deletion screen illustrated in FIG. 22 deletes the association setting between face authentication machine 1 and the collation group.

The deletion screen is provided with list display unit 216, face authentication machine designator 217, and delete button 218. In list display unit 216, the device ID of each authentication machine, the collation group (number) associated with each face authentication machine 1, and the description about the collation group are displayed. In addition, list display unit 216 is provided with a check box for each association setting. The association setting can be selected by the check box. When the registration item to be deleted is selected by the check box and delete button 218 is operated, processing of deleting the selected registration item is performed on face management server 5. In face authentication machine designator 217, face authentication machine 1 can be selected from the pull-down menu. As a result, the display content of list display unit 216 is updated in a state of narrowing down to specific face authentication machine 1.

Here, by selecting reference on the menu screen (not illustrated), the screen transfers to the reference screen illustrated in FIG. 21A. In addition, by selecting registration on the menu screen, the screen transfers to the registration screen illustrated in FIG. 21B. In addition, by selecting deletion on the menu screen, the screen transfers to the deletion screen illustrated in FIG. 22. In addition, by selecting update on the menu screen, the screen transfers to the update screen (not illustrated). In addition, when the administrator selects the association between face authentication machine 1 and the collation group on the reference screen, the screen transfers to the update screen (not illustrated).

In the example illustrated in FIG. 22, although the registered associations are displayed in a list on the deletion screen, the deletion may be performed on the individual edit screen. In addition, the update screen (not illustrated) is the same as the registration screen (FIG. 21B).

Figure 23:
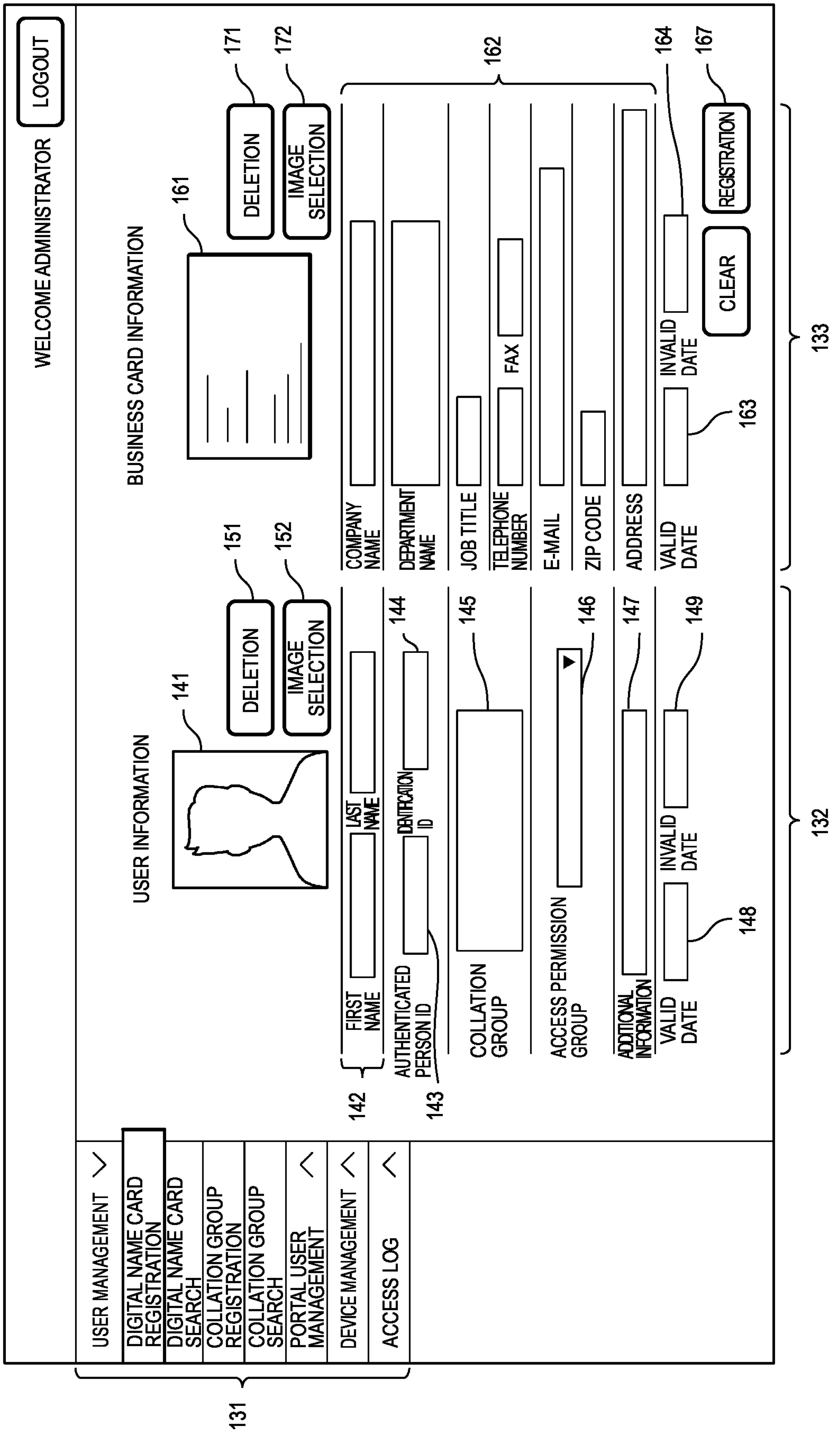
FIG. 23 is an explanatory diagram illustrating an example of a management screen of the user displayed on management terminal 2.

FIG. 23 is an explanatory diagram illustrating an example of a management screen of the user displayed on management terminal 2.

Management terminal 2 displays the management screen of the user illustrated in FIG. 23 when managing information on the user.

The management screen of the user illustrated in FIG. 23 is for the administrator to perform operations of registering, referencing, updating, deleting, and searching for a face image and specific information (here, business card information) related to the user. The information (including images) input to the management screen of the user includes the information acquired by registration device 4.

The management screen of user includes operation selection area 131, user information area 132, and business card information area 133.

In operation selection area 131, the administrator can select items to be performed (information registration, reference, update, deletion, search, and the like). In FIG. 23, business card registration is selected as an item to be performed. As a result, the administrator can newly input business card description information displayed on the management screen of the user.

User information area 132 includes a face image of the user, first and last name, and information used for face authentication. Here, user information area 132 includes face image display unit 141, first and last name input unit 142, user ID input unit 143, identification ID input unit 144, collation group input unit 145, access permission group input unit 146, additional information input unit 147, activation date input unit 148, and invalidation date input unit 149.

The face image of the user is displayed on face image display unit 141. The administrator can delete the face image of face image display unit 141 by pressing delete button 151. In a case where the face image cannot be acquired by registration device 4, the administrator can select the prepared face image (image file) as a display target by pressing image selection button 152. Alternatively, the administrator can display the face image selected by image selection button 152 on face image display unit 141 instead of the face image acquired by registration device 4. The face image prepared by the administrator is not limited to the actual face image of the user, and may be a dummy image (for example, avatar image of the user).

In first and last name input unit 142, the first and last name of the user is input. In user ID input unit 143, a user ID (for example, employee number) is input. In identification ID input unit 144, an ID that can identify the user (for example, a series of unique numbers assigned in the order of registration of the user) is input. In collation group input unit 145, a collation group is input. In access permission group input unit 146, an access permission group indicating an administrator group who can access user information is input. In additional information input unit 147, additional information can be input. In activation date input unit 148, a date on which the face collation of the person can be valid is input. In invalidation date input unit 149, a date on which the face collation can be invalid is input. By setting these activation dates and invalidation dates, it is possible to start or end services for a plurality of users at the same time.

Business card information area 133 includes a captured image of the business card registered by registration device 4 and information extracted from the captured image of the business card. Here, business card information area 133 includes business card image display unit 161, affiliation information input unit 162, activation date input unit 163, and invalidation date input unit 164.

The business card image of the user is displayed on business card image display unit 161. By pressing delete button 171 and image selection button 172, the administrator can delete the business card image or select the prepared business card image (image file), similarly to the case of the above-described face image.

In affiliation information input unit 162, the company name to which the user belongs, the department name of the user, the job title, the telephone number, the fax number, the e-mail, the zip code, the address, and the like are input. In activation date input unit 163, a date on which the information on the business card of the person can be valid is input. In invalidation date input unit 164, a date on which the information on the business card of the person can be invalid is input.

When the administrator presses registration button 167 after completing the input to the desired input unit, the input (added or changed) information is valid.

On the management screen of the user, other specific information (for example, information displayed on a payment card or information indicating the place where the user stays in the facility) can be managed as well as the business card description information or instead of the business card description information.

In addition, the administrator can search for necessary information by selecting a search tab (for example, collation group search) in operation selection area 131 on the management screen of the user. In the search screen for such information, each input unit on the above-described management screen of the user is displayed as a blank. For example, the administrator can search for users belonging to the input collation group by inputting the collation group to be searched into blank collation group input unit 145.

When the administrator inputs search conditions with the required items on the search screen and presses the search button (not illustrated), the screen transfers to a list display screen that reflects the search results (for example, screen illustrating a list of extracted users).

Figure 24:
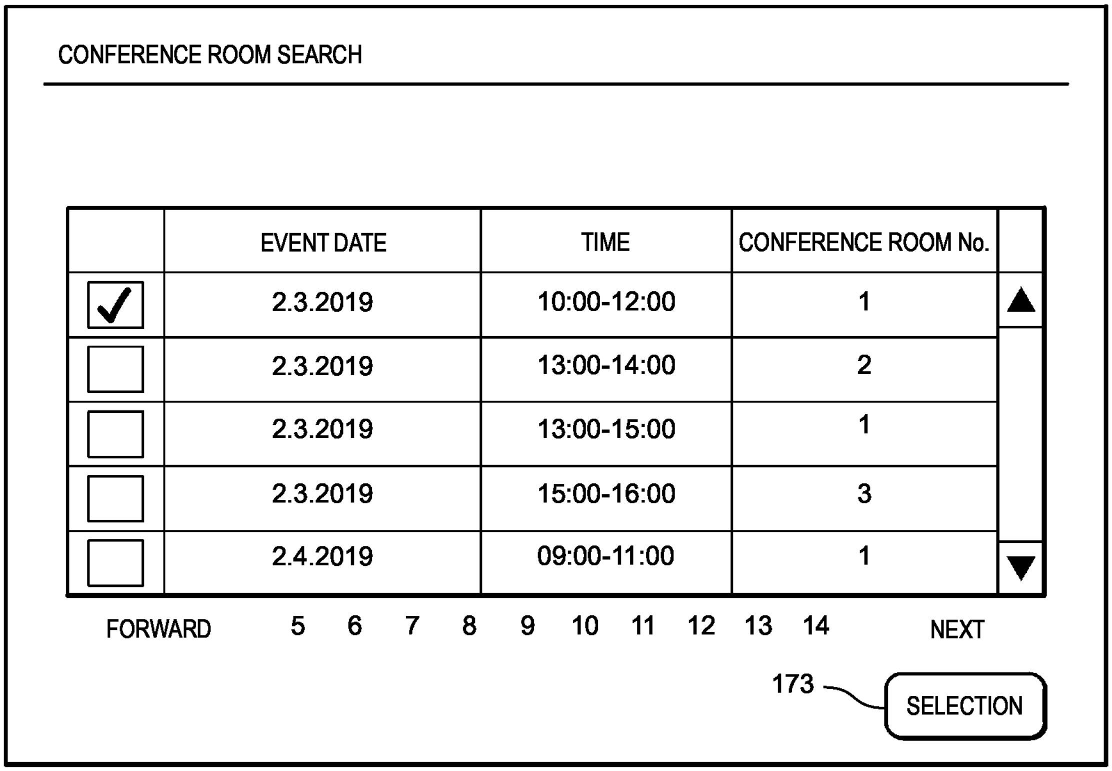
FIG. 24 is an explanatory diagram illustrating an example of a conference room search screen displayed on management terminal 2.
Figure 25:
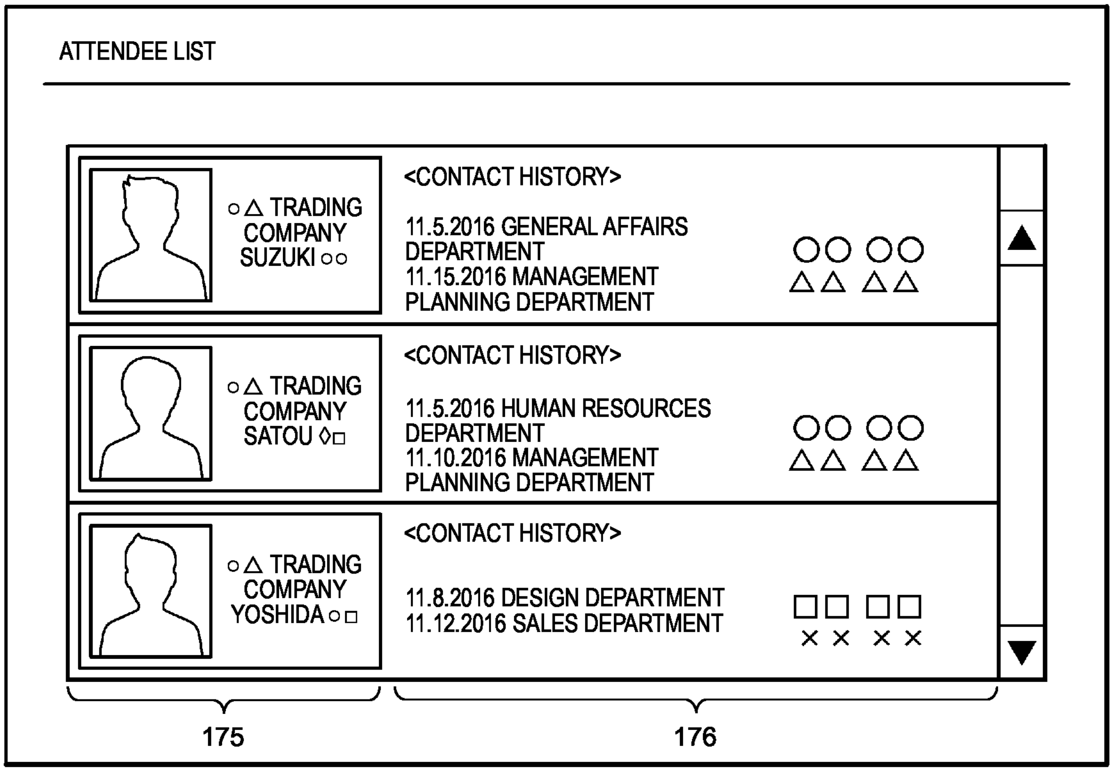
FIG. 25 is an explanatory diagram illustrating an example of an attendee display screen displayed on management terminal 2.

Next, the use of information on the user will be described. FIG. 24 is an explanatory diagram illustrating an example of a conference room search screen (conference search screen) displayed as a management screen on management terminal 2 or the like. FIG. 25 is an explanatory diagram illustrating an example of an attendee display screen displayed as a management screen on management terminal 2.

The conference room search screen illustrated in FIG. 24 is for the administrator to use (reference) the information on the conference acquired in the face authentication processing. By accessing face management server 5 from management terminal 2, the administrator can appropriately add information that cannot be acquired by face authentication machine 1 related to the conference held at the facility.

Information such as the event date, time, and room number (conference room No.) is displayed on the conference room search screen related to the conference held in the past in the conference room of the facility. Information on the entry history acquired by face authentication machine 1 cooperated with the lock device for the door of the conference room can be used to generate the conference room search screen. When the administrator selects a desired conference (click the check box of the conference illustrated at the top in FIG. 24) and presses selection button 173, the screen transfers to the search result display screen in which the search result is reflected.

As the search result display screen, for example, as illustrated in FIG. 25, an attendee display screen including an attendee list is displayed on management terminal 2.

The attendee list includes attendee information area 175 and respondent information area 176. In attendee information area 175, a face image and specific information (here, the name of the company to which the user belongs and the name of the user) of the attendee of the conference are displayed. In addition, in respondent information area 176, information on the person (here, department and name) who responded to the attendee (for example, worker of a company occupying the facility) is displayed.

Figure 26:
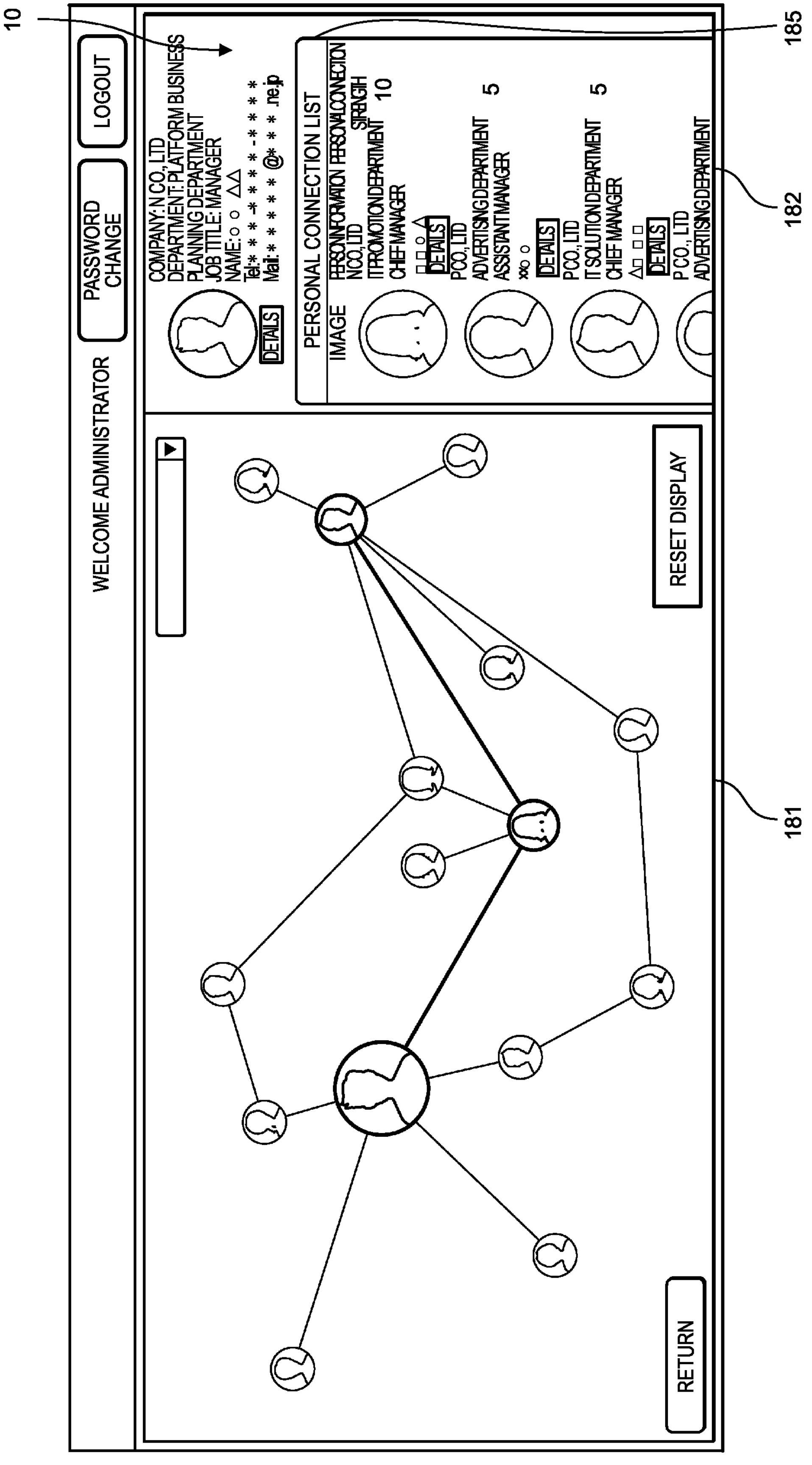
FIG. 26 is an explanatory diagram illustrating an example of a personal connection search screen displayed on management terminal 2.

FIG. 26 is an explanatory diagram illustrating an example of a personal connection search screen displayed as a management screen on management terminal 2.

The personal connection search screen illustrated in FIG. 26 is for the administrator to use (refer) information on the personal connections of user 10 acquired in the face authentication processing (here, information on the connections of people estimated from the information on the attendee of the conference). By accessing face management server 5 from management terminal 2, the administrator can appropriately add necessary information on the personal connections of the user.

The personal connection search screen includes correlation diagram display area 181 and list display area 182. In correlation diagram display area 181, a diagram that visualizes the personal connections related to the person selected by the administrator is displayed. In addition, in list display area 182, personal connection list 185 relating to the person (user 10) selected by the administrator is displayed. In personal connection list 185, a face image of a person, affiliation information (company name, department, and the like), a numerical value indicating the strength of the personal connection (personal connection strength), and the like are displayed.

Such a personal connection search screen may be displayed by the administrator selecting (clicking) an area of a desired attendee on the attendee display screen of FIG. 25, for example.

The use of the conference room search screen and the personal connection search screen described above is not required to be limited to those via management terminal 2. For example, by granting access rights as an administrator to a facility user (for example, worker of a company occupying the facility), the information processing terminal (PC, tablet, and the like) owned by the user may be able to refer to the conference room search screen and the personal connection search screen.

As described above, the exemplary embodiment is described as an example of the techniques disclosed in the present application. However, the technique in the present disclosure is not limited thereto, and can be applied to exemplary embodiments in which changes, replacements, additions, omissions, and the like are made. In addition, it is also possible to combine the components described in the above exemplary embodiment to form a new exemplary embodiment.

In recent years, in the world of Internet of Things (IoT), Cyber-Physical Systems (CPS), which is a new concept of creating new added value by linking information between physical space and cyber space, has been attracting attention. Under these circumstances, the CPS concept can also be adopted in the present exemplary embodiment. That is, as a basic configuration of the CPS, for example, an edge device disposed in a physical space and a cloud server disposed in a cyber space can be connected via a network, and face authentication processing can be distributed and processed by a processor installed in the edge device and cloud server. In the face authentication processing, face image data of the user captured by the camera of the authentication machine is acquired as the edge device. Next, the cloud server performs processing of generating feature data from the face image data received from the edge device via the network, collates the feature data with the feature data of the user registered in advance, performs the authentication processing of the user, takes over the authentication result related to the authentication processing by the face authentication application software, and displays the authentication result on the display or the like in an output format defined on the application. Here, each data generated in the edge device or the cloud server is preferably generated by a Web application or the like mounted on a standardized platform, and by using such a standardized platform, it is possible to improve the efficiency when constructing a system including various sensor groups and IoT application software.

INDUSTRIAL APPLICABILITY

The gate open/close control device and the gate open/close control method according to the present disclosure have the effect of easily performing the face authentication when the user enters and leaves the facility while safely managing the face image of the user who uses the facility and are useful as a gate open/close control device that controls open/close of a gate device through which a target person passes based on a result of face authentication of the target person and a gate open/close control method.

REFERENCE MARKS IN THE DRAWINGS

1 face authentication machine
2 management terminal
3 face authentication server
4 registration device
5 face management server
6 face collation server
10 user
11 camera (face image acquirer)
12 display (display unit)
14 storage unit
15 controller (processor)
16 external device
25 authentication result adjustor (history information generator)
41A face capturing camera (personal information acquirer)
41B information acquisition camera (personal information acquirer)
42 display (display unit)
45 controller (processor)
62 user manager
64 device manager
90 image generator
97 power feeder

The invention claimed is:

1. A gate open/close control device that makes a processing request, for face authentication of a user in a facility, to a face authentication server which performs the face authentication, the gate open/close control device making the processing request when the user passes through a gate device for entering and leaving the facility, the gate open/close control device controlling opening/closing of the gate device according to an authentication result, the gate open/close control device comprising:

a memory that stores collation group information, the collation group information identifying a collation group associated with the gate open/close control device, the collation group information being stored in the memory upon activation of the gate open/close control device;

a camera that captures an image of the user before passing through the gate device and acquires a face image for authentication of the user;

a transmitter that transmits the processing request, for the face authentication, to the face authentication server based on the face image for authentication and the collation group of the gate open/close control device;

a receiver that receives the authentication result from the face authentication server; and a controller that reflects the authentication result on an open/close control signal of the gate device, wherein the face authentication server is configured to communicate with a plurality of face collation servers, each of the plurality of face collation servers corresponds to at least one of a plurality of collation groups, the face authentication server transmits the processing request to one of the plurality of face collation servers which corresponds to the collation group of the gate open/close control device, and the one of the plurality of face collation servers collates face feature amount data of the face image with face feature amount data of registered users to determine the authentication result.

2. The gate open/close control device of claim 1, further comprising:

a power feeder that receives a power supply from the gate device.

3. The gate open/close control device of claim 1, further comprising:

a storage that stores the face image for authentication, wherein the face image for authentication, which is stored in the storage, is deleted after the face authentication is completed.

4. A gate open/close control method performed by gate open/close control device that makes a processing request, for face authentication of a user in a facility, to a face authentication server which performs the face authentication, the processing request being made when the user passes through a gate device for entering and leaving the facility, opening/closing of the gate device being controlled according to an authentication result, the gate open/close control method comprising:

storing, by the gate open/close control device, collation group information, the collation group information identifying a collation group associated with the gate open/close control device, the collation group information being stored upon activation of the gate open/close control device;

capturing an image of the user before passing through the gate device and acquiring a face image for authentication of the user;

transmitting, by the gate open/close control device, the processing request, for the face authentication, to the face authentication server based on the face image for authentication and the collation group of the gate open/close control device;

receiving, by the gate open/close control device, the authentication result from the face authentication server; and reflecting the authentication result on an open/close control signal of the gate device, wherein the face authentication server is configured to communicate with a plurality of face collation servers, each of the plurality of face collation servers corresponds to at least one of a plurality of collation groups, the face authentication server transmits the processing request to one of the plurality of face collation servers which corresponds to the collation group of the gate open/close control device, and the one of the plurality of face collation servers collates face feature amount data of the face image with face feature amount data of registered users to determine the authentication result.

5. The gate open/close control device of claim 2, wherein the power feeder is configured to receive a second power supply from an uninterruptible power supply device.

6. The gate open/close control device of claim 5, wherein the power feeder is connected to the gate device via a network cable, and the power supply is received from the gate device via the network cable.

* * * * *